(12) United States Patent
Trammell et al.

(10) Patent No.: US 8,749,107 B2
(45) Date of Patent: Jun. 10, 2014

(54) SPACER FOR SUPPORTING CONDUCTORS IN AN ELECTRIC MACHINE

(75) Inventors: Richard E. Trammell, Noblesville, IN (US); Arlen Phillip Suter, Pendleton, IN (US); Steve Burton, Anderson, IN (US)

(73) Assignee: Remy Technologies, L.L.C., Pendleton, IN (US)

( * ) Notice: Subject to any disclaimer, the term of this patent is extended or adjusted under 35 U.S.C. 154(b) by 364 days.

(21) Appl. No.: 13/314,031

(22) Filed: Dec. 7, 2011

(65) Prior Publication Data

US 2013/0147306 A1 Jun. 13, 2013

(51) Int. Cl.
H02K 3/34 (2006.01)

(52) U.S. Cl.
USPC .............................. 310/215; 310/71

(58) Field of Classification Search
USPC ...................... 310/215, 71, 198, 201
See application file for complete search history.

(56) References Cited

U.S. PATENT DOCUMENTS

| | | | |
|---|---|---|---|
| 5,280,206 A | 1/1994 | Ando et al. | |
| 5,828,147 A | 10/1998 | Best | |
| 6,362,544 B2 | 3/2002 | Johnston et al. | |
| 6,369,473 B1 | 4/2002 | Baumeister | |
| 6,545,243 B1 | 4/2003 | Sorg et al. | |
| 6,661,146 B2 | 12/2003 | Oohashi | |
| 6,700,282 B2 | 3/2004 | Mori et al. | |
| 6,825,586 B2 | 11/2004 | Edrington | |
| 6,894,417 B2 | 5/2005 | Cai et al. | |
| 7,034,428 B2 | 4/2006 | Cai et al. | |
| 7,256,364 B2 | 8/2007 | Gentry et al. | |
| 7,329,973 B2 * | 2/2008 | Oohashi et al. | 310/71 |
| 7,348,705 B2 | 3/2008 | Cai et al. | |
| 7,622,843 B2 | 11/2009 | Cai | |
| 7,687,954 B2 | 3/2010 | Neet et al. | |
| 7,788,790 B2 | 9/2010 | Neet | |
| 7,788,791 B2 | 9/2010 | Hara | |
| 7,808,137 B2 | 10/2010 | Neet | |
| 7,808,148 B2 | 10/2010 | Neet | |
| 7,911,105 B2 | 3/2011 | Neet | |
| 7,982,355 B2 * | 7/2011 | Takizawa et al. | 310/215 |
| 2003/0214190 A1 | 11/2003 | Congdon et al. | |
| 2008/0042508 A1 | 2/2008 | Cai et al. | |
| 2011/0175472 A1 | 7/2011 | Koike et al. | |
| 2012/0025661 A1 * | 2/2012 | Sakane et al. | 310/215 |
| 2012/0175992 A1 * | 7/2012 | Jang et al. | 310/215 |

* cited by examiner

Primary Examiner — Hanh Nguyen
(74) Attorney, Agent, or Firm — Faegre Baker Daniels LLP

(57) ABSTRACT

A spacer for supporting conductors in a stator assembly of an electric machine includes a plurality of positioning elements cooperating with various conductors in the specials region of the winding arrangement. The spacer illustratively includes an insulating body formed of an electrically non-conductive material and including surfaces facing axially inwardly for contacting short conductors and crossover pockets for receiving crossover conductors which electrically connect an inner winding set and an outer winding set. The spacer further illustratively includes phase lead pockets facing axially outwardly for receiving a terminal phase lead conductor.

26 Claims, 18 Drawing Sheets

SPACER FOR SUPPORTING CONDUCTORS IN AN ELECTRIC MACHINE

BACKGROUND AND SUMMARY OF THE INVENTION

The present invention relates generally to electric machines and, more particularly, to a spacer for electrically insulating various conductors forming a winding arrangement in a stator assembly of an electric machine.

Electric machines may be used for a variety of applications, including in connection with automobile power trains. For example, a conventional automobile may use an electric machine as a starting motor for an internal combustion engine, or as an alternator to generate electricity and deliver power to vehicle accessories and/or charge a vehicle's battery.

An illustrative electric machine includes a rotor and a stator. The stator is comprised of a stator stack or core and a plurality of electrical conductors, or windings, that are inserted into the stator stack. The windings are interconnected (e.g., welded together) at weld-end turns or joints in order to form a circuit that is necessary for operation of the electric machine. In particular, the electric machine operates when the stator interacts with the rotor through magnetic fields to convert electric energy to mechanical energy, or to convert mechanical energy to electrical energy.

The conductors may form a multi-phase electric machine. Each phase interconnects to the other phases in order to complete a full circuit. The conductors are electrically insulated from each other to insure that the motor does not short. A common concern with motor fabrication is possible damage to the conductors during the manufacturing process. This may be caused by bends and twists formed in the conductor so that the routing within the stator is optimized. Depending upon the dimensions and configuration of the stator, the bends and twists may be extreme. More particularly, damage may occur in the insulation supported on the outer surface of the conductors.

The present disclosure relates to a spacer for supporting conductors in the stator assembly of an electric machine, the spacer including an insulating body formed of an electrically non-conductive material. A first surface is supported by the insulating body and faces axially inwardly for contacting a plurality of short electrical conductors of an inner winding set. A second surface is supported by the insulating body and is positioned radially inwardly from the first surface and faces axially inwardly for contacting a plurality of short electrical conductors of an outer winding set. A crossover pocket is supported by the insulating body and extends radially intermediate the first surface and the second surface, and faces axially inwardly for receiving an electrical conductor defining a crossover conductor to electrically connect the inner winding set and the outer winding set. A phase lead pocket is supported by the insulating body and faces axially outwardly for receiving a terminal phase lead conductor.

According to a further illustrative embodiment of the present disclosure, an electric machine includes a stator core including a sidewall extending about a longitudinal axis. An inner winding set is supported by the stator core and includes a plurality of common electrical conductors and a plurality of short electrical conductors. The first winding set is a multi-phase winding provided in a first conductor layer and a second conductor layer positioned radially outwardly from the first conductor layer. An outer winding set is supported by the stator core and is positioned radially outwardly from the inner winding set and includes a plurality of common electrical conductors and a plurality of short electrical conductors. The second winding set is a multi-phase winding provided in a third conductor layer and a fourth conductor layer positioned radially outwardly from the third conductor layer. A plurality of crossover conductors is supported by the stator core for electrically connecting the inner winding set and the outer winding set. A plurality of terminal phase lead conductors are supported by the stator core, each terminal phase lead conductor electrically coupled to one of the phases of the inner and outer winding sets. A spacer includes an insulating body formed of a non-conductive material, the spacer positioned axially outwardly from the stator core and including a plurality of positioning elements cooperating with short electrical conductors of the inner and outer winding sets, with the common electrical conductors of the inner and outer winding sets, with the plurality of crossover conductors, and with the terminal phase lead conductors.

According to another illustrative embodiment of the present disclosure, a method of forming a stator assembly of an electric machine includes the steps of providing a stator core having an insertion end and an opposing end, placing a plurality of common electrical conductors within slots of the stator core, placing a plurality of short electrical conductors within slots of the stator core, placing a plurality of crossover conductors within slots of the stator core, and positioning a spacer proximate the insertion end of the stator core. The method further includes the steps of aligning a first surface of the spacer with the short electrical conductors, aligning crossover pockets with the crossover conductors, and moving the spacer toward the insertion end of the stator core such that the short electrical conductors engage the first surface and are pushed into the slots of the stator core, and the crossover conductors are received within the crossover pockets of the spacer.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
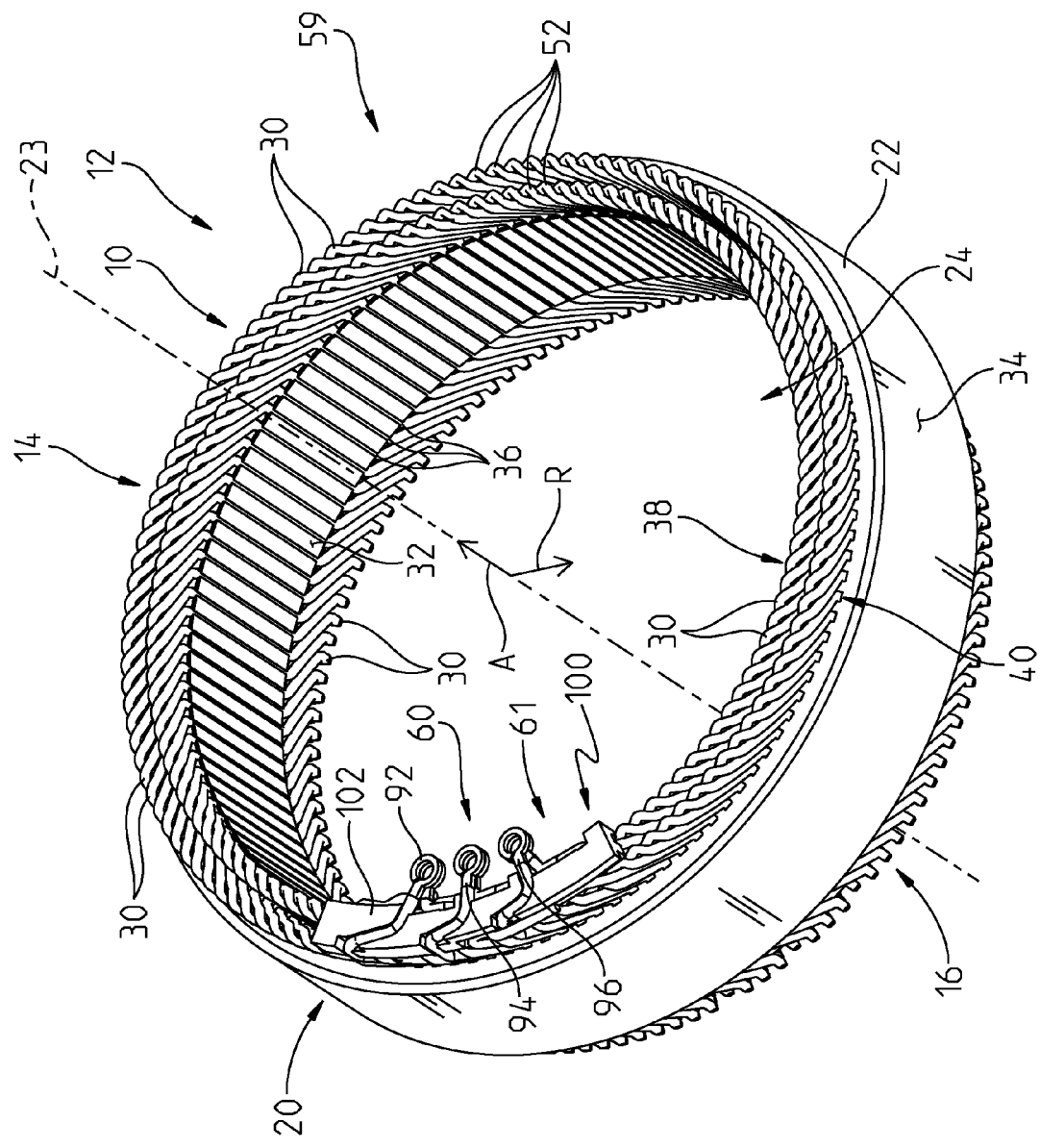
FIG. 1 is a perspective view of an illustrative stator assembly from the insertion side.

Referring initially to FIG. 1, a perspective view of an illustrative parallel stator assembly 10 for use in an electric machine 12 is shown. The stator assembly 10 is considered to be in parallel since its phase windings are interconnected in parallel, as further detailed herein. The stator assembly 10 includes an insertion end 14 and an opposing or connection end 16. The electric machine 12 when used a as a motor (such as a starting motor or traction motor) includes a stator assembly 10 operably coupled to a rotor (not shown) through magnetic fields in order to convert electrical energy to mechanical energy. In a similar manner, electric machine 12 may also be used as an alternator or generator to generate electricity by converting mechanical energy to electrical energy through magnetic fields and delivering power, for example, to vehicle accessories and/or to charge a vehicle's battery.

The stator assembly 10 illustratively includes a stator core or stack 20, and a plurality of electrical conductors, or windings 30. The stator core 20 includes a cylindrical side wall 22 extending about a longitudinal axis 23 and defining an open center portion 24. An axial direction A extends through the open center portion 24 between the insertion end 14 and the opposing or connection end 16 of the stator assembly 10, and a radial direction R extends perpendicular to the axial direction A away from the longitudinal axis 23 toward the side wall 22. In certain illustrative embodiments, the cylindrical wall 22 may include one or more lamination stacks or layers (not shown). In certain illustrative side embodiments, the cylindrical wall 22 may be comprised of silicone steel, which reduces hysteresis and eddy current losses during the operation of the electric machine 12. Alternatively, the cylindrical wall 22 may be comprised of a solid powdered metal body. Furthermore, the stator core 20 may include a metal (e.g., steel) frame (not shown).

The cylindrical wall 22 of the stator core 20 extends between a circumferential inner surface 32 and a circumferential outer surface 34, and illustratively includes a plurality of circumferentially-spaced, axially-extending slots 36 (FIG. 2) through which the conductors 30 are received. The illustrative stator core 20 of FIGS. 1 and 2 includes 60 (sixty) slots 36. Openings to the stator slots 36 are illustratively provided through the inner surface 32 of the stator core 20, as well as the insertion end 14 and the connection end 16 of the stator core 20.

Illustratively, the slots 36 each support at least a portion of the conductors 30, arranged in armature winding sets, including first (or inner) and second (or outer) winding sets 38 and 40, respectively. More particularly, each slot 36 illustratively includes a portion of both winding sets, including first winding set 38 and second winding set 40. The first winding set 38 in each slot 36 includes two conductors 30 of one phase, and the second winding set 40 in each slot 36 includes two conductors 30 of another phase. Similarly, each of the other slots 36 in the illustrative embodiment also comprise two conductors 30 of one phase and two conductors 30 of another phase. In other illustrative embodiments, it is also possible that each of the slots 36 contain all four conductors 30 of the same phase. The illustrative winding arrangement discloses herein is a three-phase winding arrangement, including phases A, B, and C. However, it should be appreciated that the present disclosure may be applied to other multi-phase winding arrangements.

Figure 2:
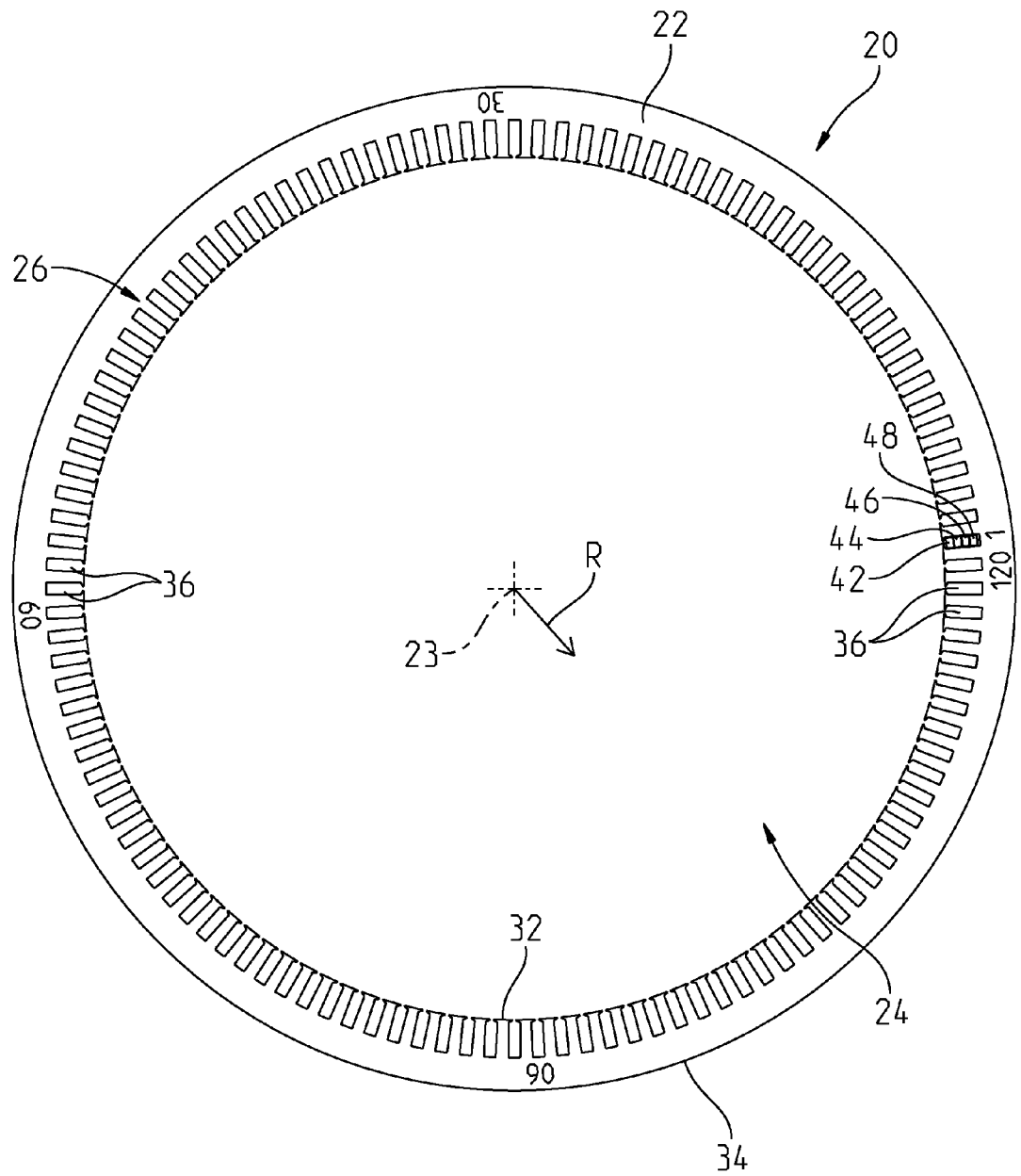
FIG. 2 is a top diagrammatic view of the stator core of FIG. 1, showing the slots therein.
Figure 5:
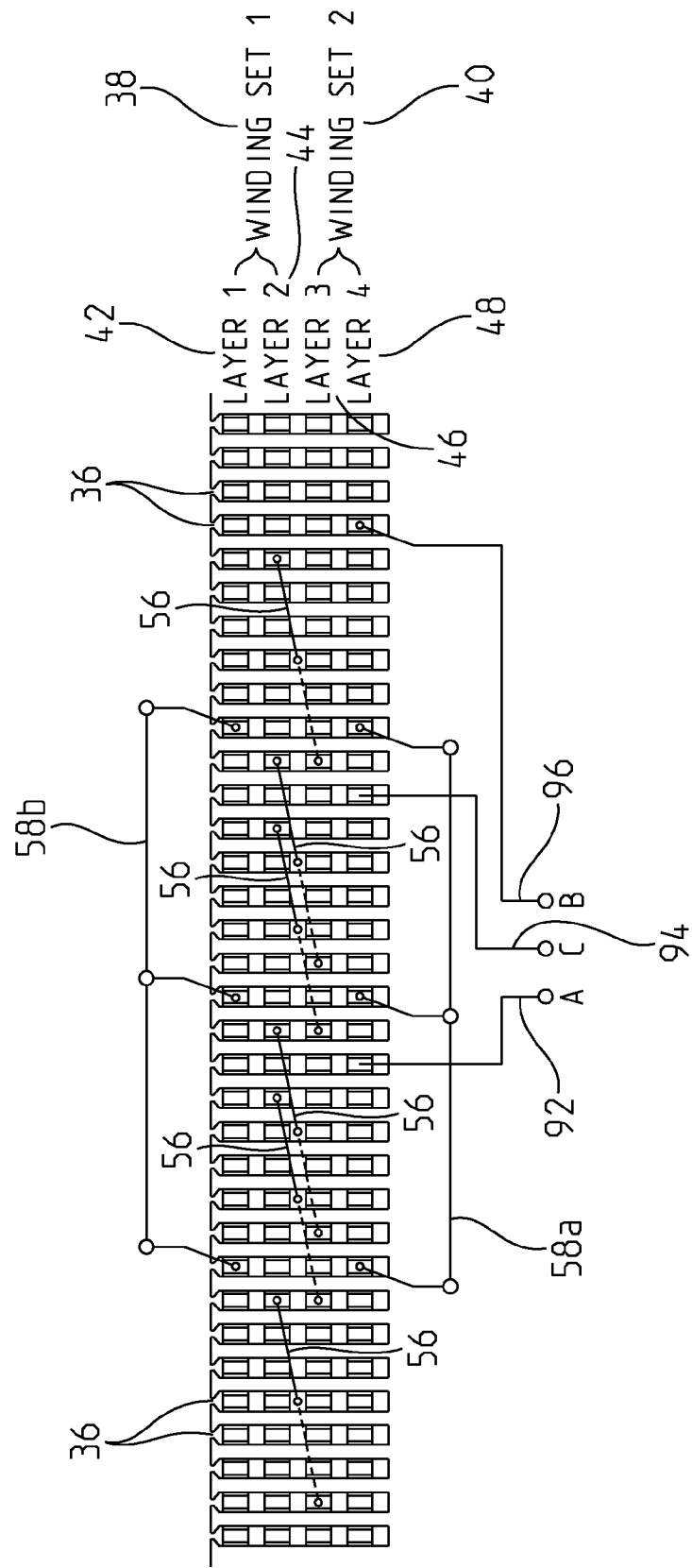
FIG. 5 is a schematic representation of special connections made at the insertion end of the illustrative stator assembly of FIG. 1.
Figure 6:
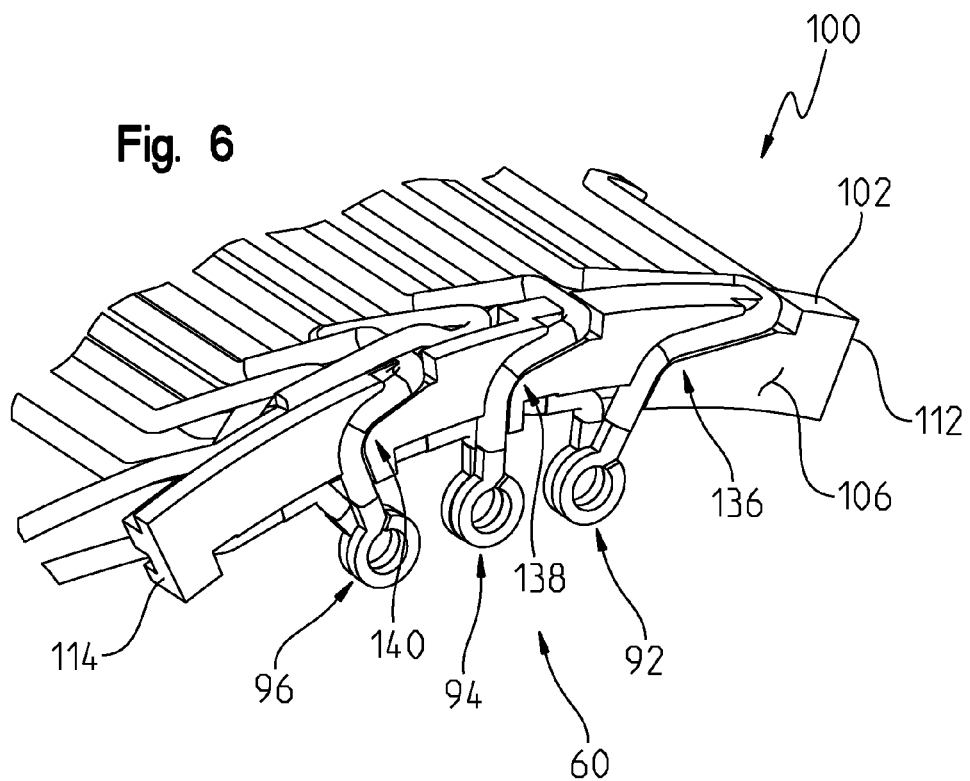
FIG. 6 is an outer perspective view of the spacer of FIG. 3, showing conductors cooperating with the spacer, with common conductors and short conductors removed for clarity.
Figure 7:
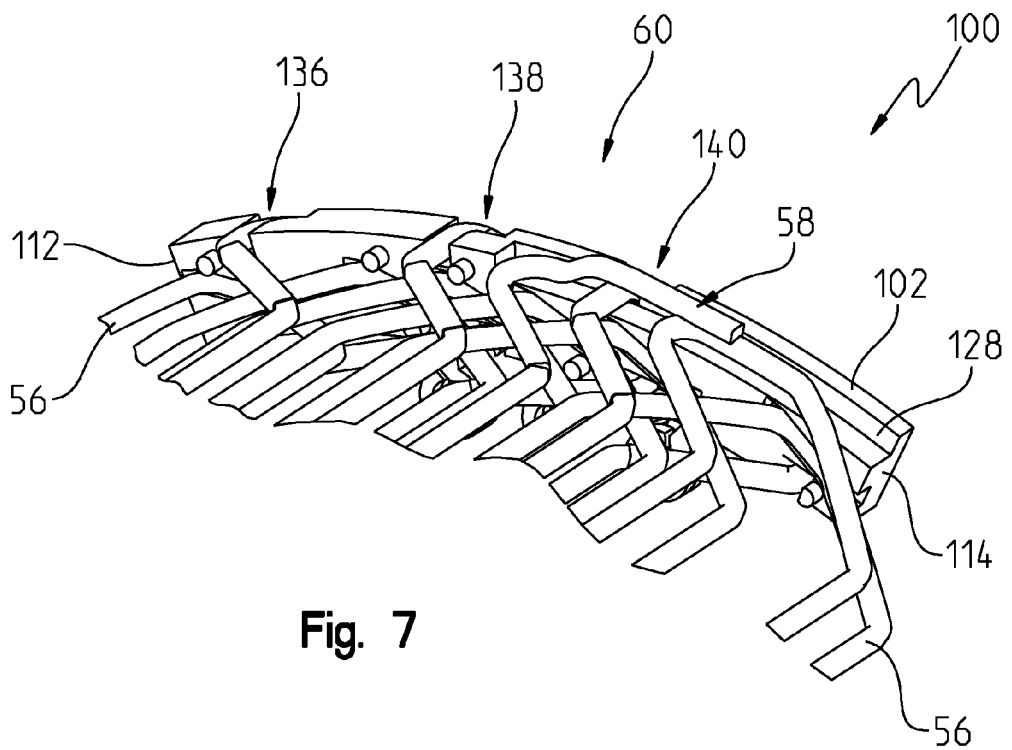
FIG. 7 is an inner perspective view similar to FIG. 6.

The conductors 30 are illustratively formed of an electrically conductive material, such as copper, having a rectangular cross-section, and are used to form the armature winding sets 38 and 40. With reference to FIGS. 2 and 5, the conductors 30 are illustratively arranged in four concentric rings or layers, with a first layer 42 positioned closest to the inner surface 32 of the stator core 20, followed by a second layer 44 positioned radially outwardly from the first layer 42, a third layer 46 positioned radially outwardly from the second layer 44, and a fourth layer 48 positioned radially outwardly from the third layer 46 and positioned closest to the outer surface 34 of the stator core 20. The first and second layers 42 and 44 define the first winding set 38, while the third and fourth layers 46 and 48 define the second winding set 40. While rectangular cross-section conductors 30 may be utilized in order to appropriate the advantages of semi-closed or fully-closed armature slots with a high slot fill ratio (SFR), other conductors (e.g., circular cross-section) may be substituted therefor.

Figure 13:
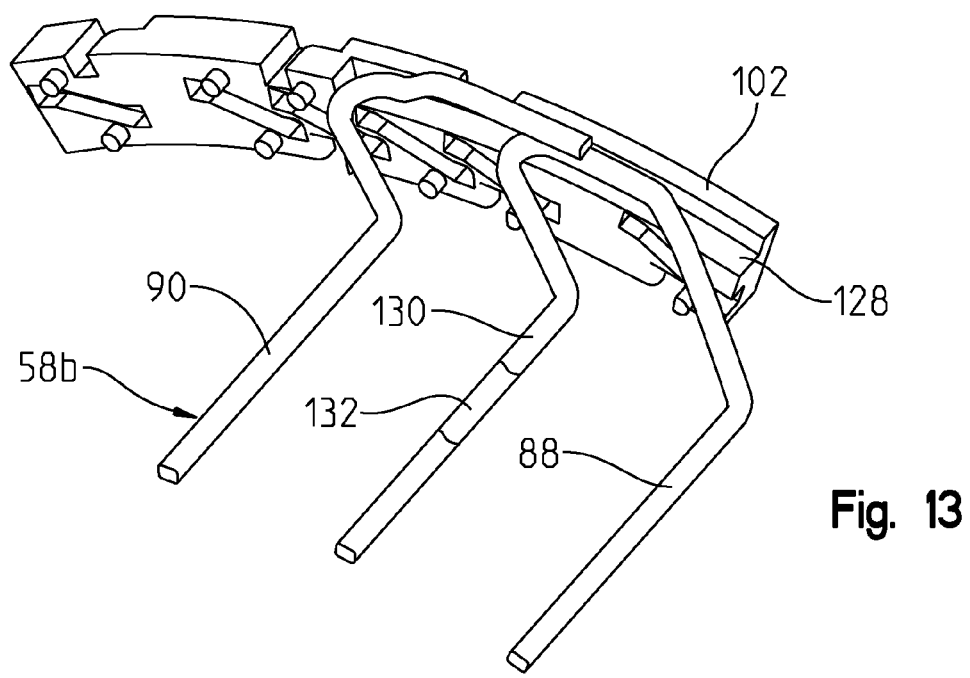
FIG. 13 is a perspective view of the neutral conductors cooperating with the spacer of FIG. 3.
Figure 14:
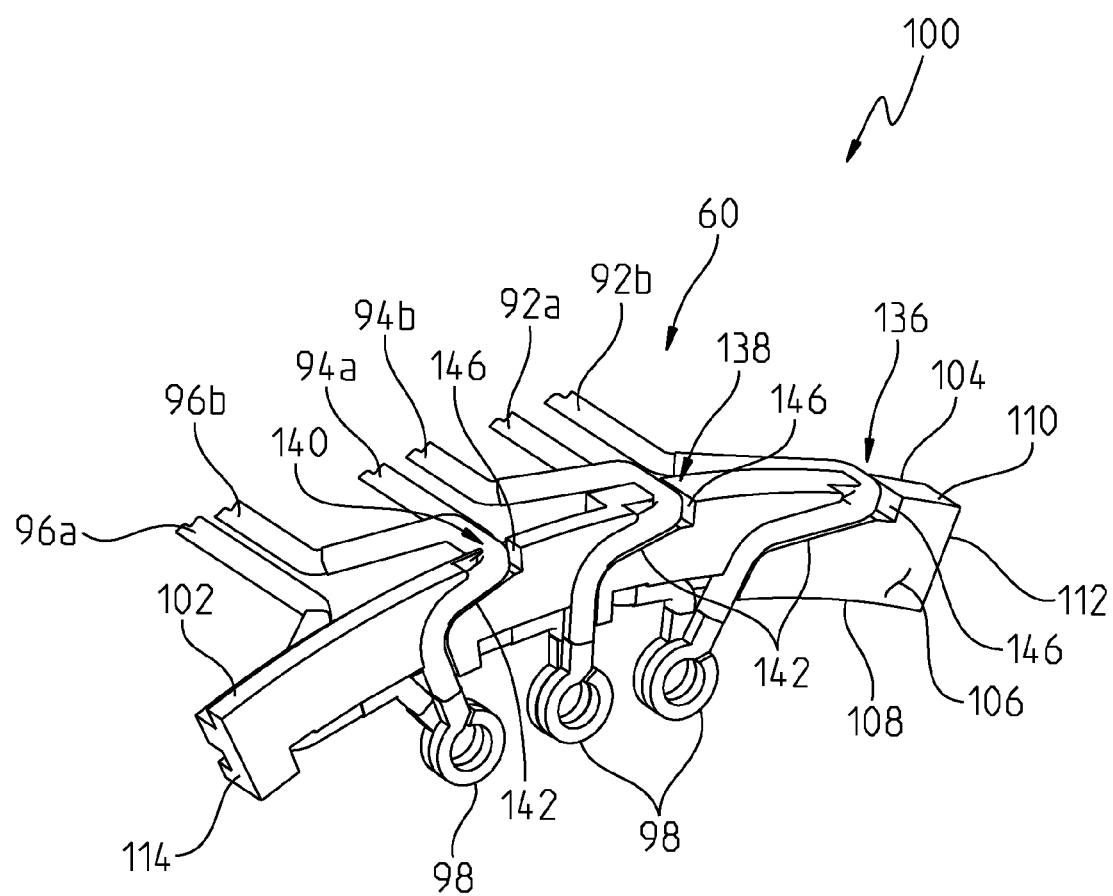
FIG. 14 is an outer perspective view showing terminal phase leads cooperating with the spacer of FIG. 3.
Figure 15:
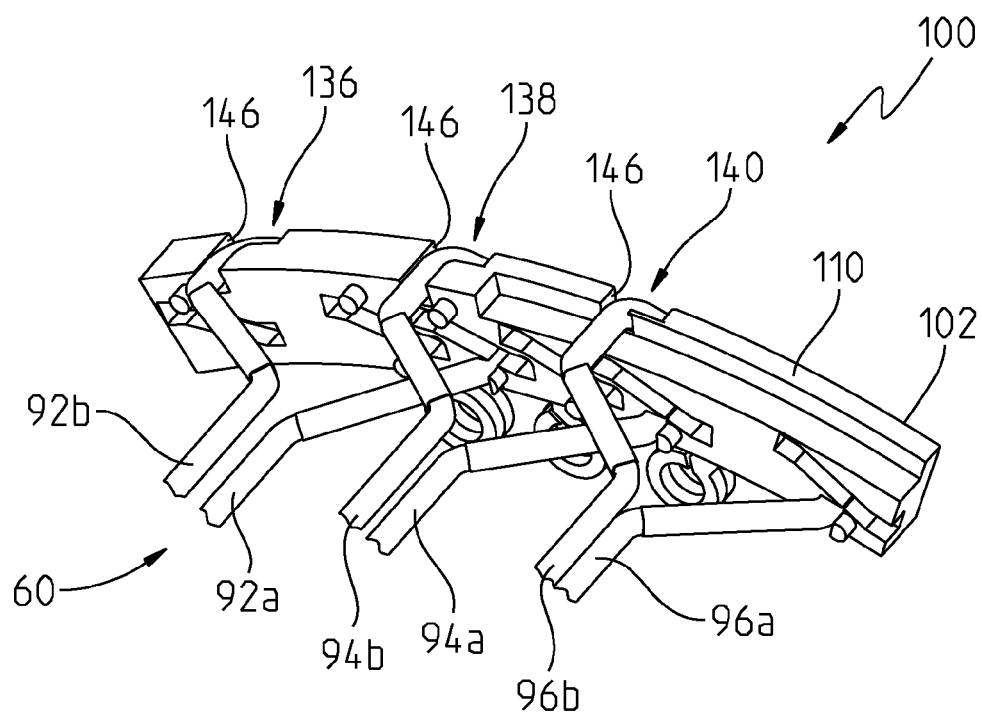
FIG. 15 is an inner perspective view similar to FIG. 14.
Figure 16:
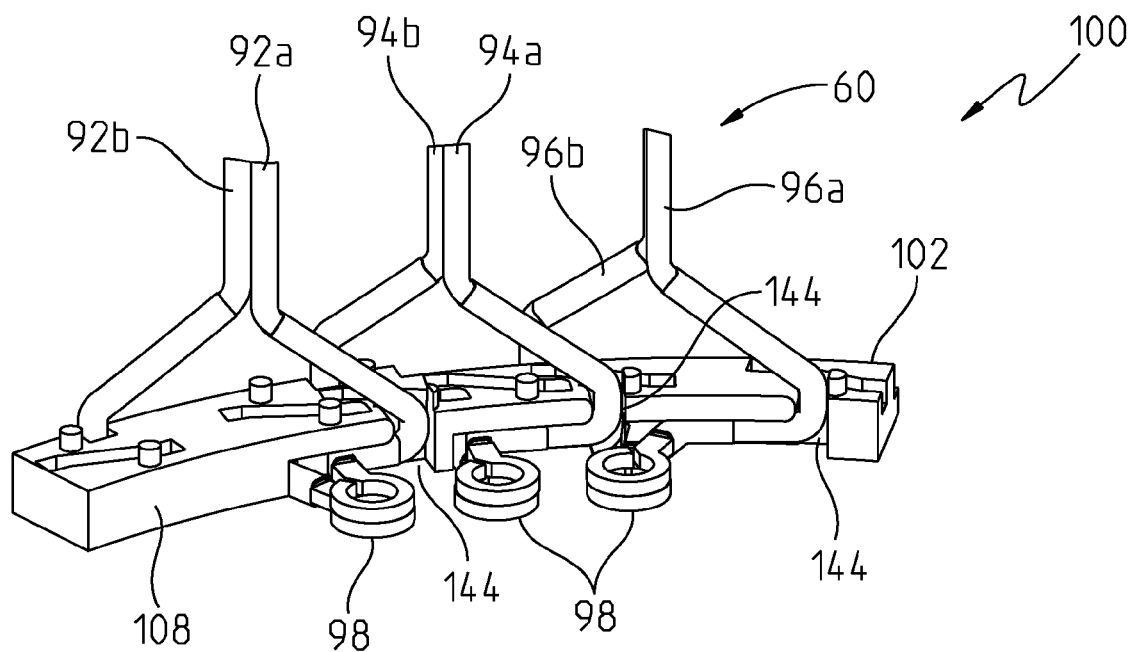
FIG. 16 is another inner perspective view similar to FIG. 15.

The electrical conductors 30 for use within the stator assembly 10 illustratively include common conductors 52 (FIGS. 8 and 9), short conductors 54 (FIGS. 10 and 11), crossover conductors 56 (FIG. 12), neutral conductor 58 (FIG. 13), and terminal phase lead conductor 60 (FIGS. 14-16). Each of the conductors 52, 54, 56, 58, 60 may be of various hairpin arrangements. Additional details regarding illustrative hairpin conductors are provided in U.S. Pat. No. 7,622,843 to Cai, which is assigned to Remy International, Inc., the disclosure of which is expressly incorporated by reference herein.

The stator assembly 10 illustratively includes a commons region 59 and a specials region 61, which are comprised of the conductors 30. As further detailed herein, electrical connections within the specials region 61 determines the type and configuration of the stator assembly 10. As is known in the art, the specials region 61 may include, for example, short conductors 54, crossover conductors 56, neutral conductors 58, and terminal phase lead conductor 60 for coupling with external electrical components (not shown). An illustrative spacer 100 is positioned within the specials region 61 for positioning and electrically insulating various conductors 30.

Figure 8:
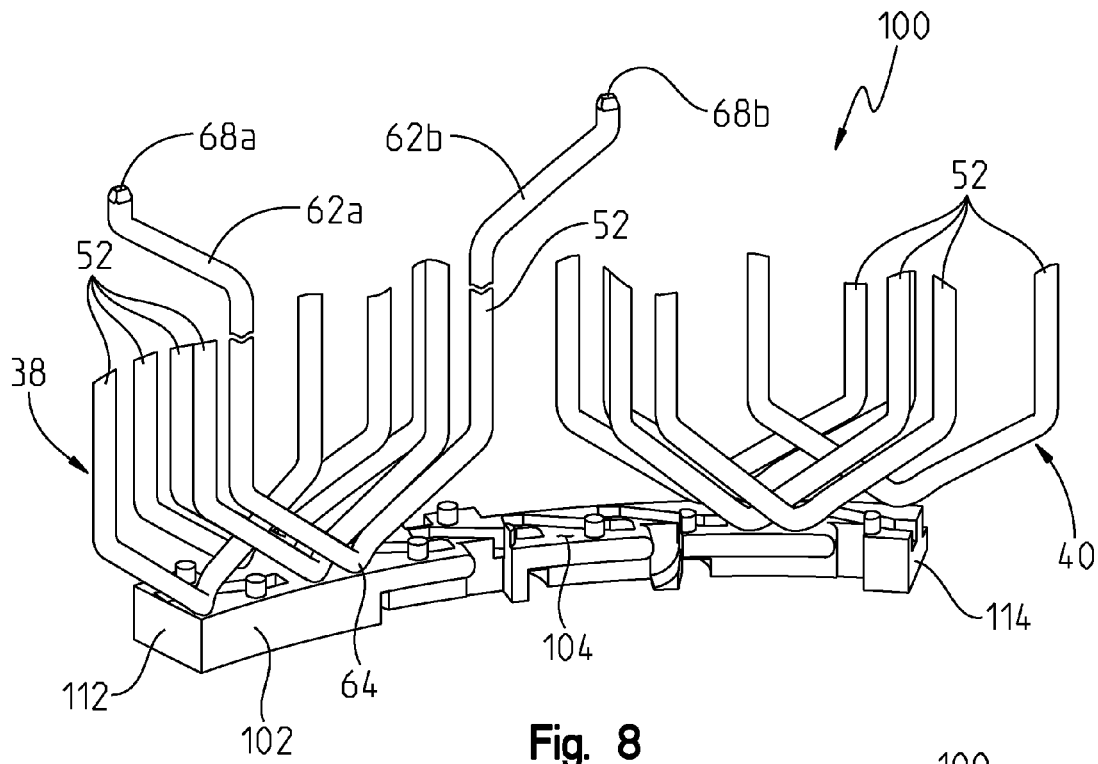
FIG. 8 is an inner perspective view showing the common conductors cooperating with the spacer of FIG. 3.
Figure 9:
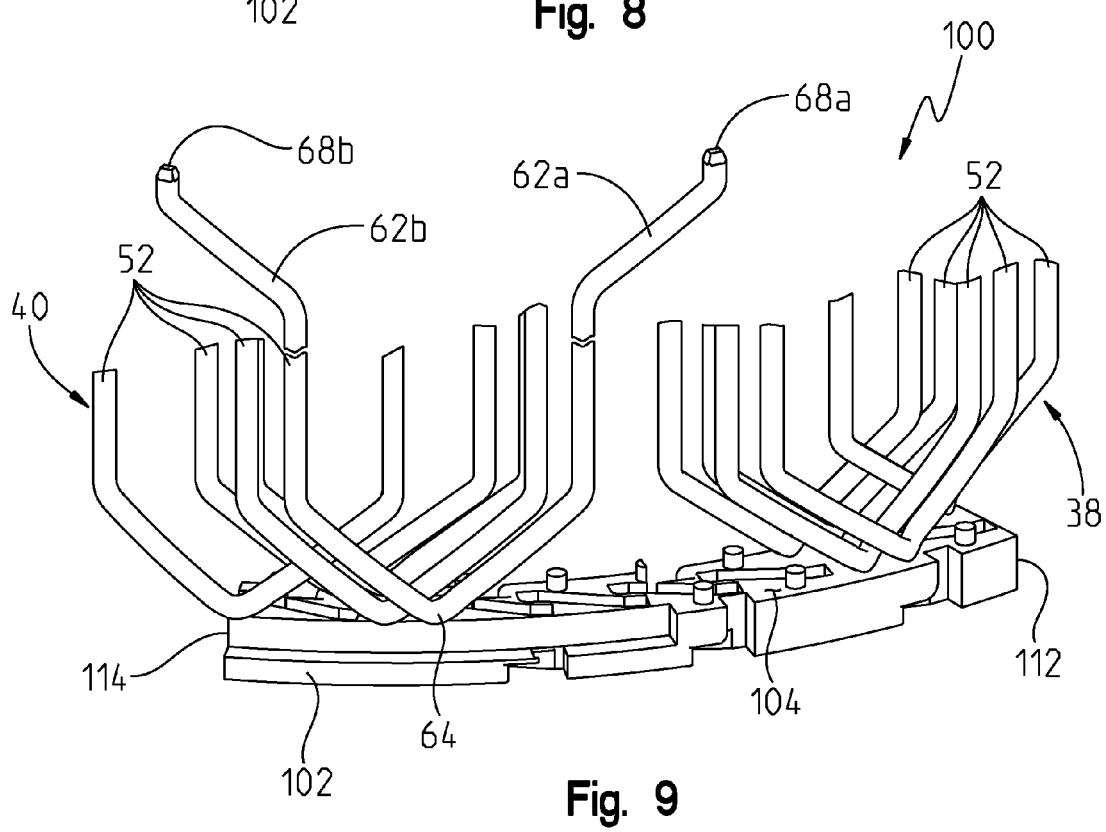
FIG. 9 is an outer perspective view similar to FIG. 8.

With reference to FIGS. 8 and 9, common conductors 52 are used in the first and second winding sets 38 and 40. These are the most numerous (i.e., common) conductors 30 used within the stator assembly 10 and have a general U-shaped hairpin arrangement, including first and second legs 62a and 62b separated by a turn portion 64. Each leg 62a and 62b includes an associated leg end 68a and 68b (FIG. 8). The direction of the conductor 52 changes by substantially 180 degrees at the turn portion 64. Each common conductor 52 spans a predetermined member of slots 36 (i.e., pitch) within its respective winding set 38 and 40. In certain illustrative embodiments, each common conductor 52 is configured to span 12 slots of its winding set 38, 40. In the illustrative embodiment, sixteen common conductors 52 are required per phase, for a total of 48 common conductors 52 (16/phase×3 phases=48).

Figure 10:
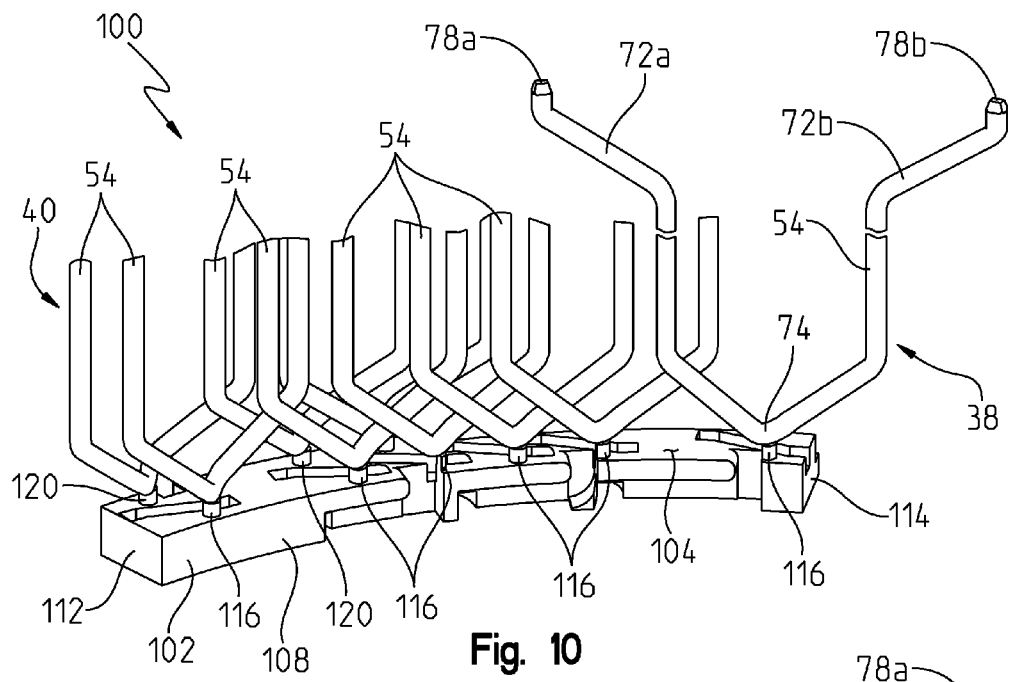
FIG. 10 is an inner perspective view showing short conductors cooperating with the spacer of FIG. 3.
Figure 11:
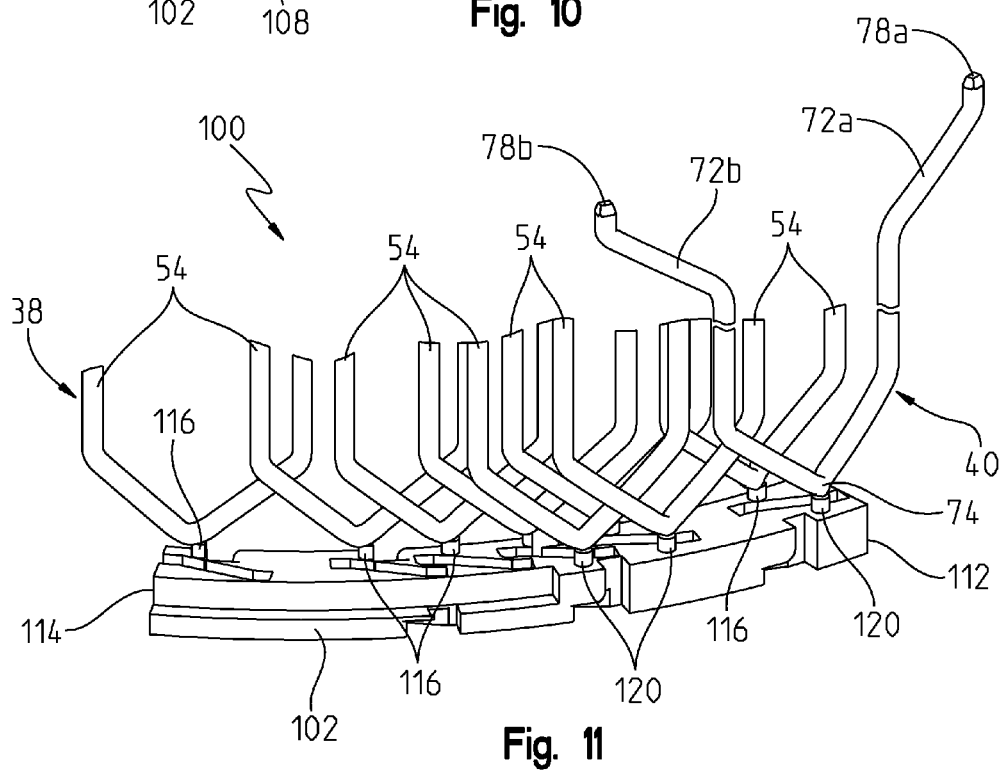
FIG. 11 is an outer perspective view similar to FIG. 10.

With reference to FIGS. 10 and 11, short conductors 54 are similar to the common conductors 52, but have a shorter pitch (i.e., span fewer slots 36). The short conductors 54 also have a general U-shaped hairpin arrangement, including first and second legs 72a and 72b, with ends 78a and 78b, separated by a turn portion 74. In the illustrative embodiment, four of the short conductors 54 are required per phase, for a total of 12 short conductors 54 (4/phase×3 phases=12). Illustratively 6 short conductors 54 are provided per winding set 38, 40.

Figure 12:
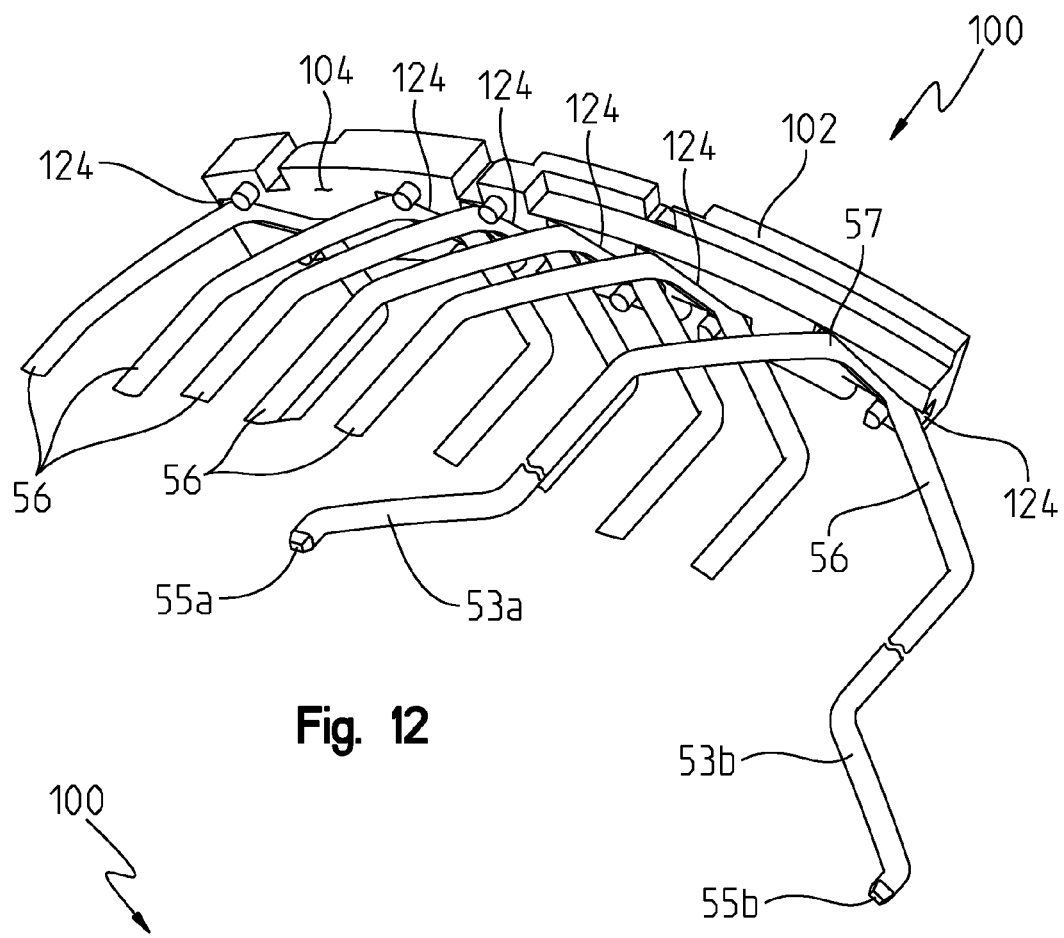
FIG. 12 is a perspective view of crossovers conductors cooperating with the spacer of FIG. 3.

Referring now to FIG. 12, crossover conductors 56 are similar to the hairpin arrangement of common conductors 52, but slightly larger in size since they are used to extend between winding sets 38 and 40 (i.e., spanning a greater distance between slots 36), and provide set-to-set connections between windings in each phase. The crossover conductors 56 have first and second legs 53a and 53b, with ends 55a and 55b, separated by a turn portion 57. In the illustrative embodiment, two crossover conductors 56 are required per phase, for a total of 6 crossover conductors 56 (2/phase×3 phases=6).

With reference to FIG. 13, neutral conductors 58 each illustratively have a W shape, including a first leg 82, a second leg 84, and a third leg 86 provided in electrical communication with the fourth layer 48 of the winding arrangement. Each neutral conductor 58 may be formed of a U-shaped hairpin conductor 88 and a single leg conductor 90. The neutral conductors 58 are used as neutral connections for the winding arrangement. Moreover, inner and outer neutral conductors 58a and 58b are required for the illustrative parallel winding arrangement (FIG. 5).

Referring now to FIGS. 14-16, terminal phase lead conductor 60 provides terminal ends for each winding phase (A, B, C) on the insertion side of the stator assembly 10 in the illustrative winding arrangement. Illustratively, the terminal phase lead conductor 60 comprise three conductors 92, 94, 96, one for each winding phase. Each conductor 92, 94, 96 includes an inner leg 92a, 94a, 96a, and an outer leg 92b, 94b, 96b, respectively. Connector eyelets 98 are positioned at the end of each terminal phase lead conductor leg 92, 94, 96.

FIG. 5 further details illustrative special connections including (1) connections required to connect winding sets 38 and 40 (i.e., connections between the second layer 44 and the third layer 46); (2) neutral connections between different phase windings; and (3) terminal connections for each phase winding. Each of these connections may be accomplished by one of the conductors detailed above, for example: (1) crossover conductors 56; (2) neutral conductors 58; and (3) terminal phase lead conductor 60; respectively.

The first type of special connection is a connection required to connect the two winding sets 38 and 40 (i.e., a connection between the second layer and the first layer). These special connections are illustratively made by the crossover conductors 56. The second type of special connection is the neutral connection between different phase windings. This special connection is illustratively made by the neutral conductors 58. The neutral connection may be provided such that the linings are connected in either star-connection or delta-connection for multi-phase machines. The third type of special connection is the terminal connection for each phase winding. This special connection is made with the terminal phase lead conductor 60.

Figure 3:
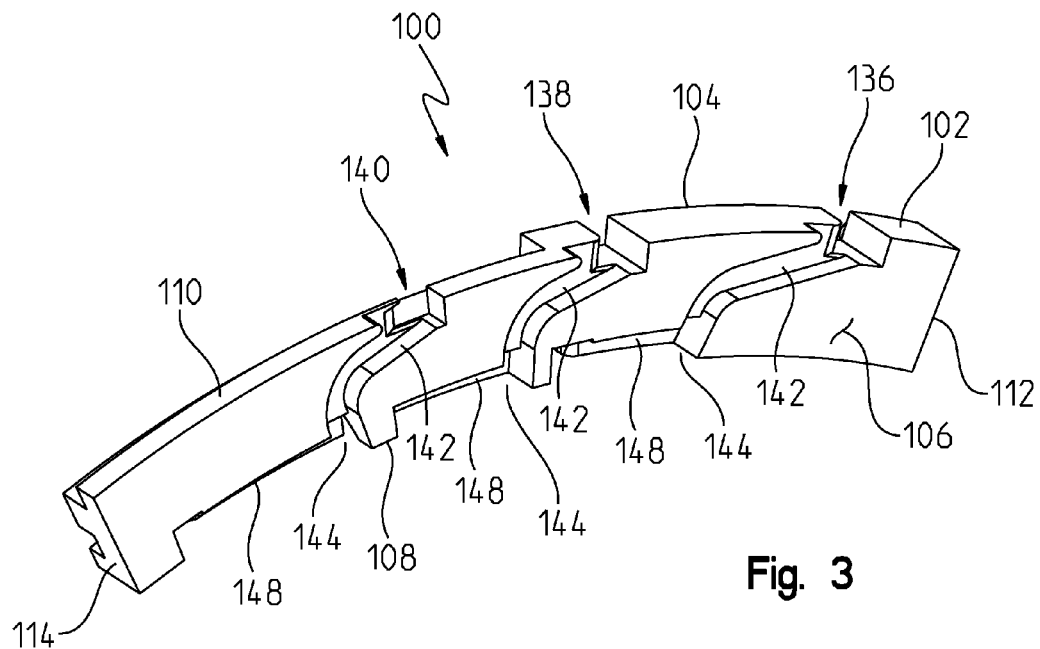
FIG. 3 is an outer perspective view of an illustrative spacer of the present disclosure.

Referring again to FIGS. 3 and 4, illustrative spacer 100 for supporting various conductors 52, 54, 56, 58, 60 includes an electrically insulating body 102. In one illustrative embodiment, the body 102 is formed of an electrically non-conductive material, such as a polymer. The polymer may be a polytetrafluoroethylene, commonly known as Teflon®. The spacer 100 is positioned axially outwardly from the stator core 24 proximate the insertion side 26 thereof. The spacer 100 is circumferentially spaced within the specials region 61 of the stator assembly 10, and is configured to locate and isolate various conductors 30 from each other to prevent inadvertent electrical contact and shorting therebetween. The spacer 100 may also be used as a pusher or assembly tool to facilitate the insertion of certain conductors 30 within the stator core 24. While the illustrative body 102 is integrally formed during a molding process, in other embodiments the body 102 may be defined by multiple components that interlock to capture various conductors 30.

The spacer 100 includes a plurality of positioning elements cooperating with various electrical conductors 30 in the specials region of the stator assembly 10, including common conductors 52, short conductors 54, crossover conductors 56, neutral conductor 58, and terminal phase lead conductor 60. The body 102 of spacer 100 includes an axially inwardly facing or inner surface 104, and an opposing axially outwardly facing or outer surface 106. Arcuate inner and outer sides 108 and 110 extend between opposing ends 112 and 114 of the body 102. The inner side 108 faces radially inwardly (toward the center axis 23 of the stator core 20), while the outer side 110 faces radially outwardly (away from the center axis 23 of the stator core 20).

Figure 4:
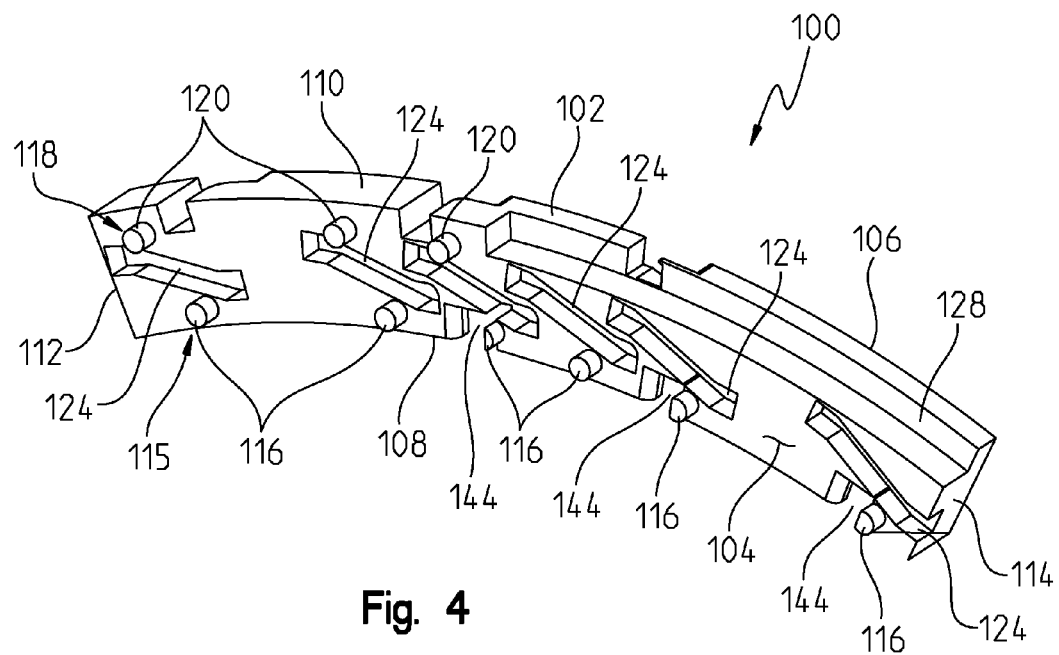
FIG. 4 is an inner perspective view of the spacer of FIG. 3.

With reference to FIGS. 4, 10, and 11, the spacer 100 includes a first positioning element defined by a first surface 115 supported by the insulating body 102 and which faces axially inwardly for contacting selective short electrical conductors 54 of the inner winding set 38. Illustratively, the first surface 115 is collectively defined by a plurality of circumferentially spaced first pegs or pads 116 extending axially inwardly from the inner surface 104 of the spacer 100. Each pad 116 contacts the turn portion 74 of a respective short conductor 54 of the inner winding set 38 A second positioning element is defined by a second surface 118 supported by the insulating body 102. The second surface 118 is positioned radially inwardly from the first surface 114 and faces axially inwardly for contacting a plurality of short electrical conductors 54 of the outer winding set 40. Again, the second surface 118 is collectively defined by a plurality of circumferentially spaced second pegs or pads 120 extending axially inwardly from the inner surface 104, the first pads 116 positioned radially inwardly from the second pads 120. Each second pad 120 contacts a turn portion 74 of a respective short conductor 54 of the outer winding set 40.

With reference to FIGS. 4, 8, and 9, the inner surface 104 defines a third positioning element or surface supported by the insulating body 102. The inner surface 104 faces axially inwardly for contacting a plurality of common conductors 52 within the specials region 61 of the outer winding set 38 and the inner winding set 40. More particularly, the surface 104 contacts turn portions 64 of selective common conductors 52 of the inner and outer winding sets 38 and 40.

Referring to FIGS. 4 and 12, a fourth positioning element is defined by a plurality of crossover pockets 124 extending inwardly within the inner surface 104 of the spacer 100 and extend radially intermediate the first surface 116 and the second surface 120. The crossover pockets 124 face axially inwardly for receiving the crossover conductors 56. More particularly, the crossover pockets 124 extend circumferentially and radially intermediate opposing surfaces 108 and 110 for accommodating the turn portions 57 of the crossover conductors 56. The crossover pockets 124 are illustratively positioned radially intermediate the first and second pads 116 and 120.

With reference to FIGS. 4 and 13, a fifth positioning element of the spacer 100 is defined by a neutral pocket 128 formed within the spacer 100 for receiving the neutral conductor 58b. The neutral pocket 128 is formed within an axially inwardly facing, radially inner edge of the insulating body 102 defined by inner surface 104 and outer side 110. In FIG. 13, a single neutral pocket 128 is shown within insulating body 102 for receiving neutral conductor 58b. However, in other illustrative embodiments, a second neutral pocket (not shown) may be formed within inner side 108 of the insulating body 102 for receiving the outer neutral conductor 58a. Illustratively, at least a portion of the neutral conductor 58 is covered with a melt-processible fluoropolymer, illustratively a fluorinated ethylene propylene (FEP) heat shrink wrap 130, over a sleeve 132 formed of para-aramid synthetic fibers (commonly known as Kevlar®) to protect the conductor 58 from abrasion and to provide electrical insulation.

Referring to FIGS. 3 and 14-16, a sixth positioning element of the spacer 100 may include a plurality of phase lead pockets 136, 138, 140 supported by the insulating body 102 for receiving the conductors 92, 94, 96 of the phase lead conductor 60. The phase lead pockets 136, 138, 140 each include first, second, third, and fourth portions 142, 144, 146, and 148 The first portion 142 is formed within the outer surface 106 of the body 102 and faces axially outwardly. The second portion 144 is an axially extending slot formed within the inner side 108 and facing radially inwardly. The third portion 146 is an axially extending slot formed within the outer side 110 and facing radially outwardly. The fourth portion 148 is a circumferentially extending slot formed in the inner side 108 of the body 102. The first portion 142, the second portion 144, and the fourth portion 148 receive the inner legs 92a, 94a, 96a of the terminal phase lead conductor 60. Similarly, the first portion 142 and the third portion 146 receive the outer legs 92b, 94b, 96b of the terminal phase lead conductor 60. The phase lead pockets 136, 138, 140 assist with positioning of eyelets 98 into proper alignment with an external terminal block (not shown). Further, the spacer 100 limits movement of phase lead legs 92, 94, 96 when coupling to the terminal block.

In certain illustrative embodiments, the body 102 of spacer 100 may be formed with heat dissipating elements. For example, channels (not shown) may be formed within the body 102 and supplied with a fluid (e.g., air or oil) to help dissipate heat from conductors 30 proximate the spacer 100.

Figure 17:
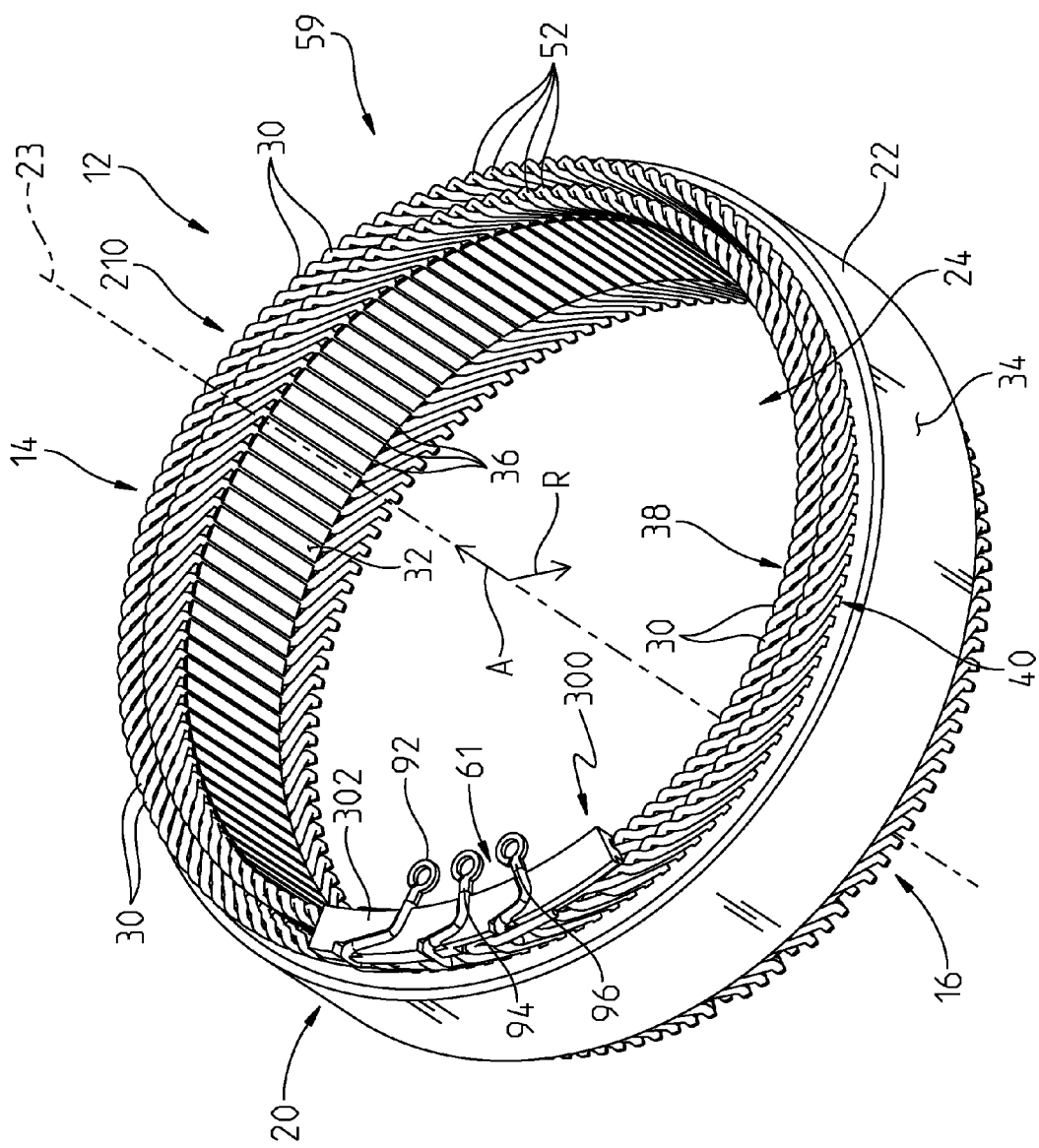
FIG. 17 is a perspective view of an illustrative stator assembly from the insertion side.

FIG. 17 shows an illustrative embodiment series stator assembly 210. Stator assembly 210 is similar to stator assembly 10 but includes conductors 30 interconnected in series as opposed to in parallel. As such, like numbers will identify similar components to those detailed above.

Figure 20:
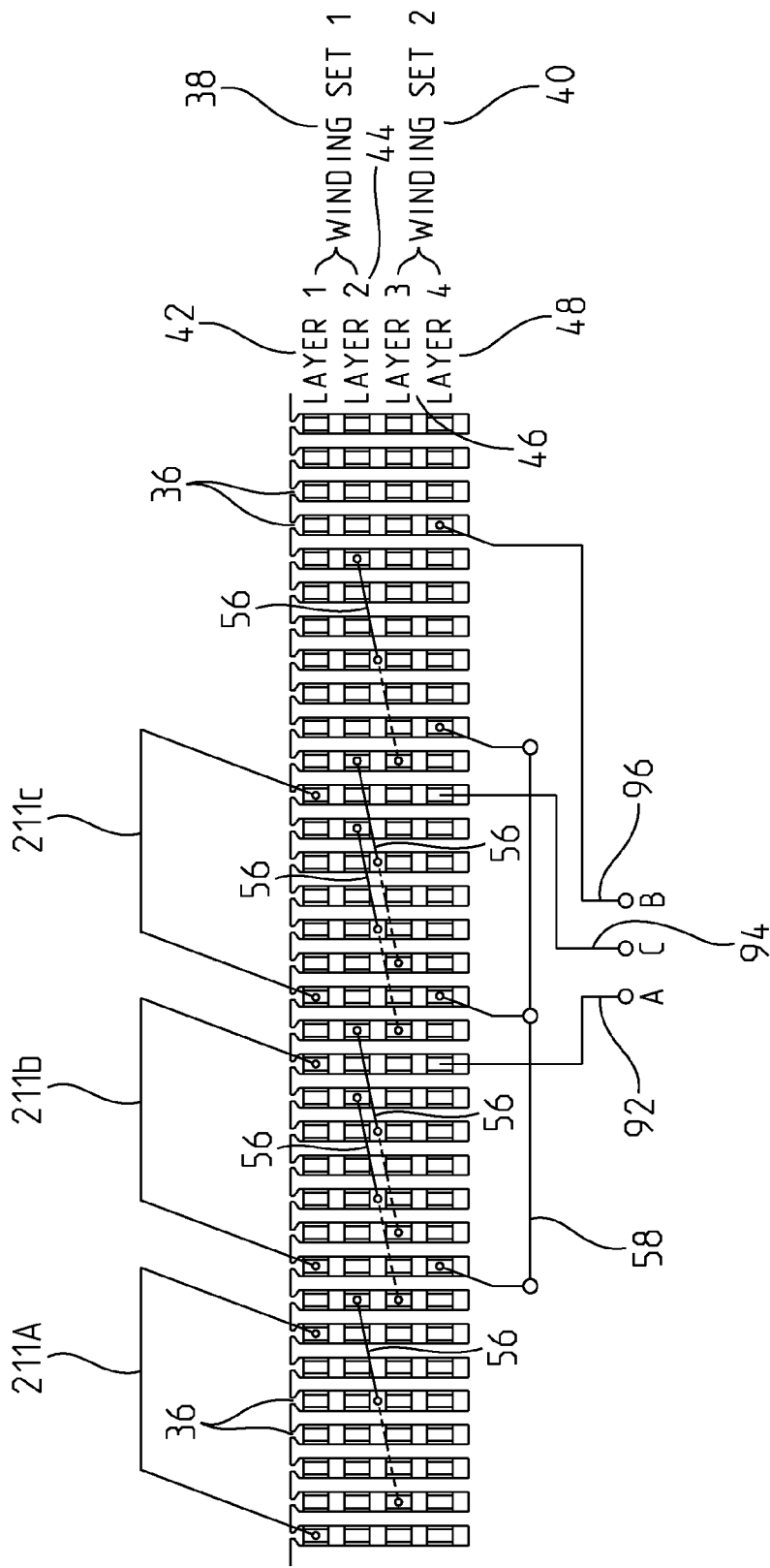
FIG. 20 is a schematic representative of special connections made at the insertion end of the illustrative stator assembly of FIG. 17.
Figure 21:
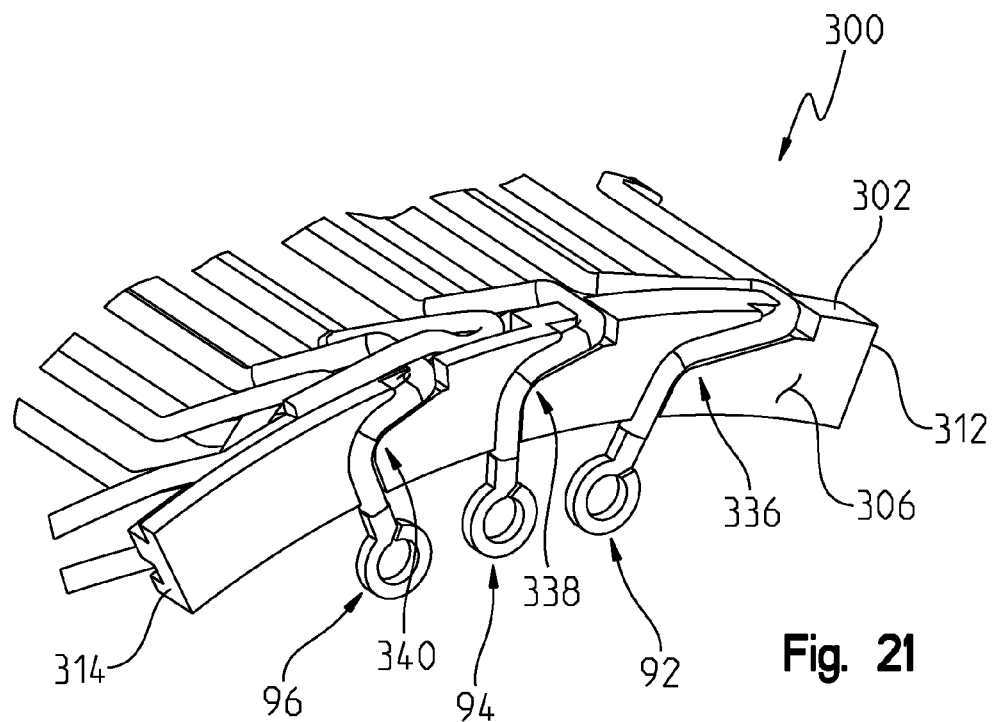
FIG. 21 is an outer perspective view showing conductors cooperating with the spacer, with common conductors and short conductors removed for clarity.
Figure 22:
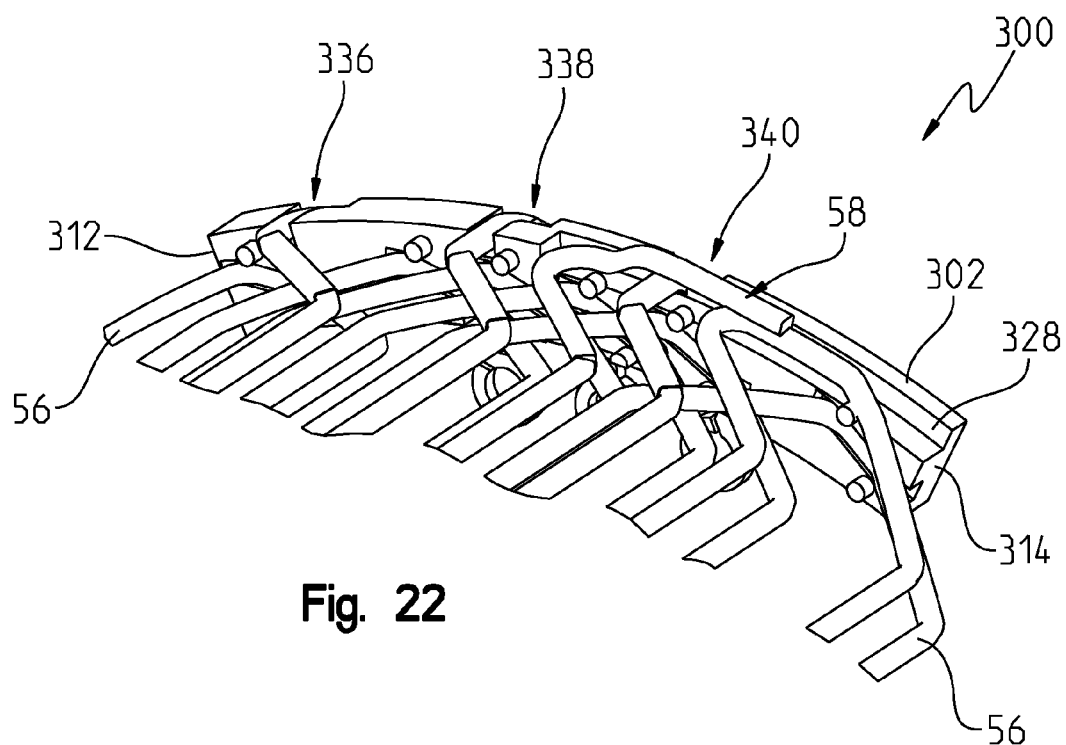
FIG. 22 is an inner perspective view similar to FIG. 21.
Figure 28:
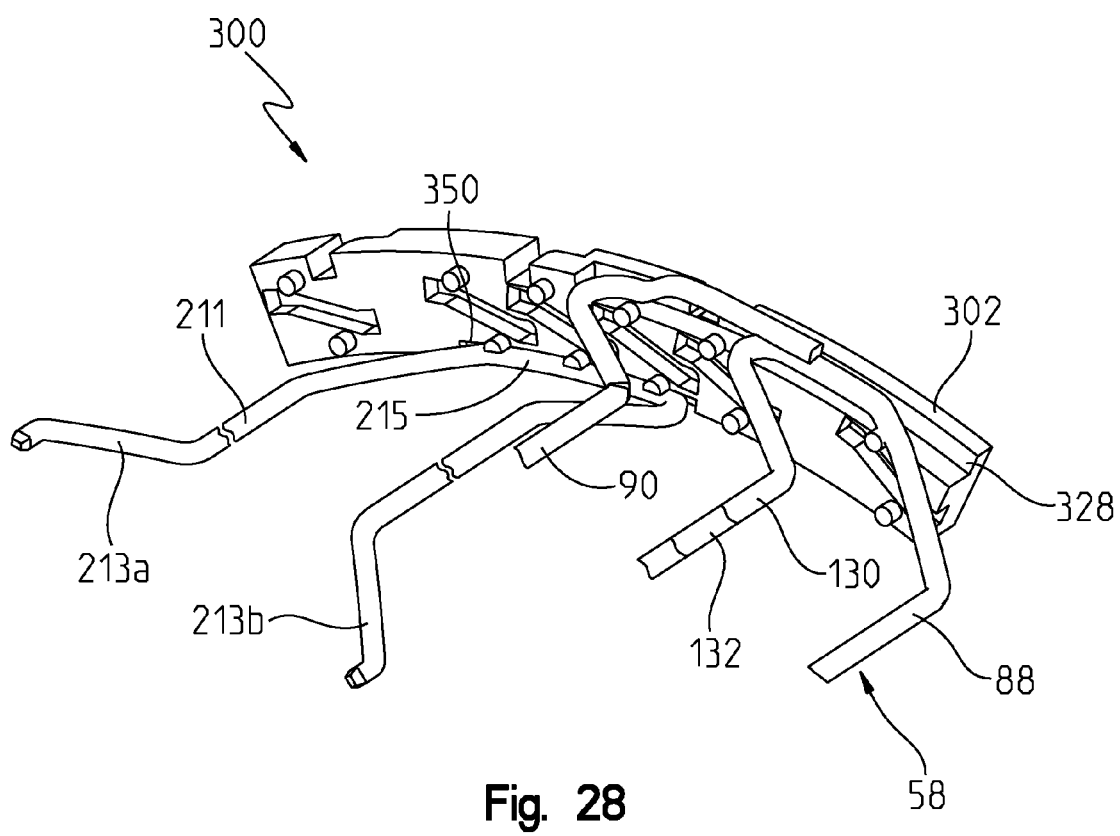
FIG. 28 is a perspective view of neutral conductors and a jumper conductor cooperating with the spacer of FIG. 18.

Along with the common conductors 52, short conductors 54, crossover conductors 56, neutral conductor 58, and terminal phase lead conductor 60, the series stator assembly 210 includes jumper conductors 211 (FIGS. 20 and 28). The jumper conductors 211 may have the same hairpin type arrangement as detailed above and are used to connect each of the phase windings in series. As shown in FIG. 28, each jumper conductor 211 includes a pair of legs 213a and 213b connected by a turn portion 215. Illustratively, a total of three jumper conductors 211a, 211b, 211c are utilized in the winding arrangement detailed herein, one per phase (1/phase×3 phases=3).

FIG. 20 is a winding diagram showing illustrative special connections in the parallel stator assembly 210. Specifically, the various conductors in the specials region provide: (1) the connections required to connect winding sets 38 and 40 (i.e., the connection between the second layer 44 and the third layer 46); (2) the neutral connection between different phase windings; (3) the terminal connections for each phase winding; and (4) the connections required to connect each of the phase windings in series (i.e., connections between phase paths). Each of these connections may be accomplished by one of the conductors detailed above, for example: (1) crossover conductors 56; (2) neutral conductor 58; (3) terminal phase lead conductor 60; and (4) jumper conductors 211; respectively.

The first type of special connection is a connection required to connect the two winding sets 38 and 40 (i.e., a connection between the second layer and the first layer). These special connections are illustratively made by the crossover conductors 56. The second type of special connection is the neutral connection between different phase windings. This special connection is illustratively made by the neutral conductors 58. The neutral connection may be provided such that the windings are connected in either star-connection or delta-connection for multi-phase machines. The third type of special connection is the terminal connection for each phase winding. This special connection is made with the terminal phase lead conductors 60. The fourth type of special connection is a connection required to connect same phase winding paths in series. The special connections are made with the jumper conductor 211.

With reference to FIGS. 18-19 and 21-22, a further illustrative spacer 300 is shown for use with the series stator assembly 210. In one illustrative embodiment, the spacer 300 includes a body 302 formed of an electrically non-conductive material, such as a polymer. The polymer may be a polytetrafluoroethylene, commonly known as Teflon®. The spacer 300 is positioned axially outwardly from the stator core 24 proximate the insertion side 14 thereof. The spacer 300 is circumferentially spaced within the specials region 61 of the stator assembly 210, and is configured to locate and isolate various conductors 30 from each other to prevent inadvertent electrical contact and shorting therebetween. The spacer 300 may also be used as a pusher or assembly tool to facilitate the insertion of certain conductors 30 within the stator core 20.

The spacer 300 includes a plurality of positioning elements cooperating with various conductors 30 in the specials region 61 of the stator assembly 10, including common conductors 52, short conductors 54, crossover conductors 56, neutral conductor 58, terminal phase lead conductor 60, and jumper conductors 211. The body 302 of spacer 300 includes an axially inwardly facing or inner surface 304, and an opposing axially outwardly facing or outer surface 306. Arcuate inner and outer sides 308 and 310 extend between opposing ends 312 and 314 of the body 302. The inner side 308 faces radially inwardly (toward the center axis 23 of the stator core 20), while the outer side 310 faces radially outwardly (away from the center axis 23 of the stator core 20).

Figure 19:
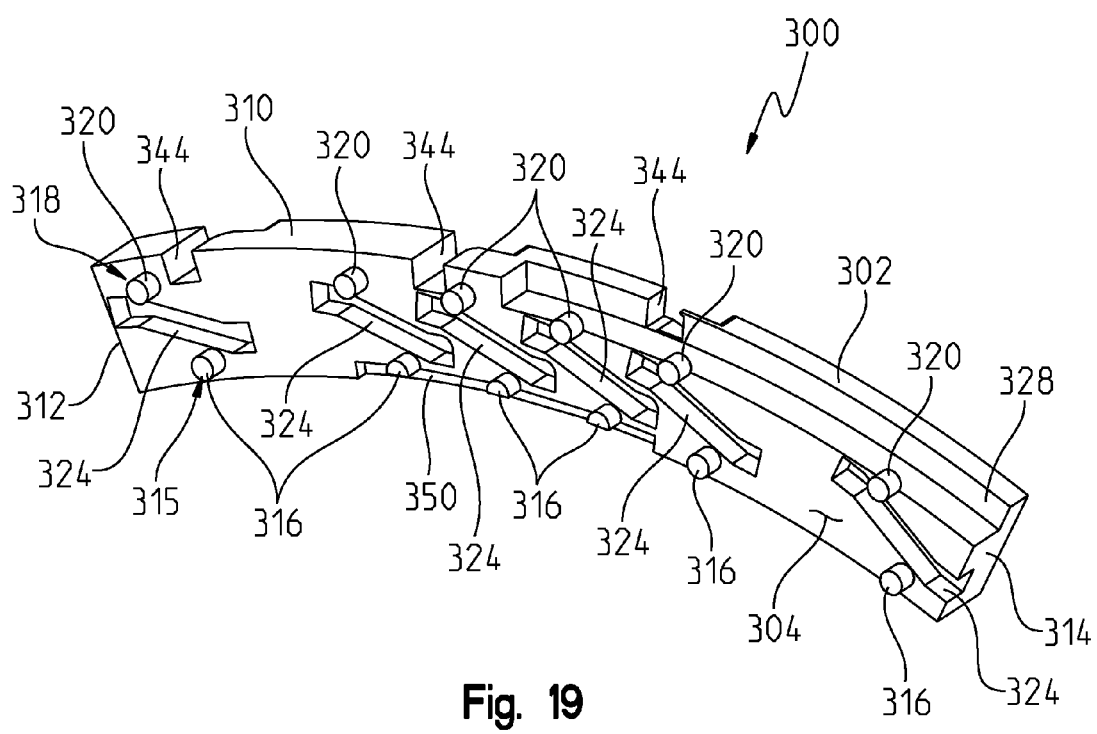
FIG. 19 is an inner perspective view of the spacer of FIG. 18.
Figure 25:
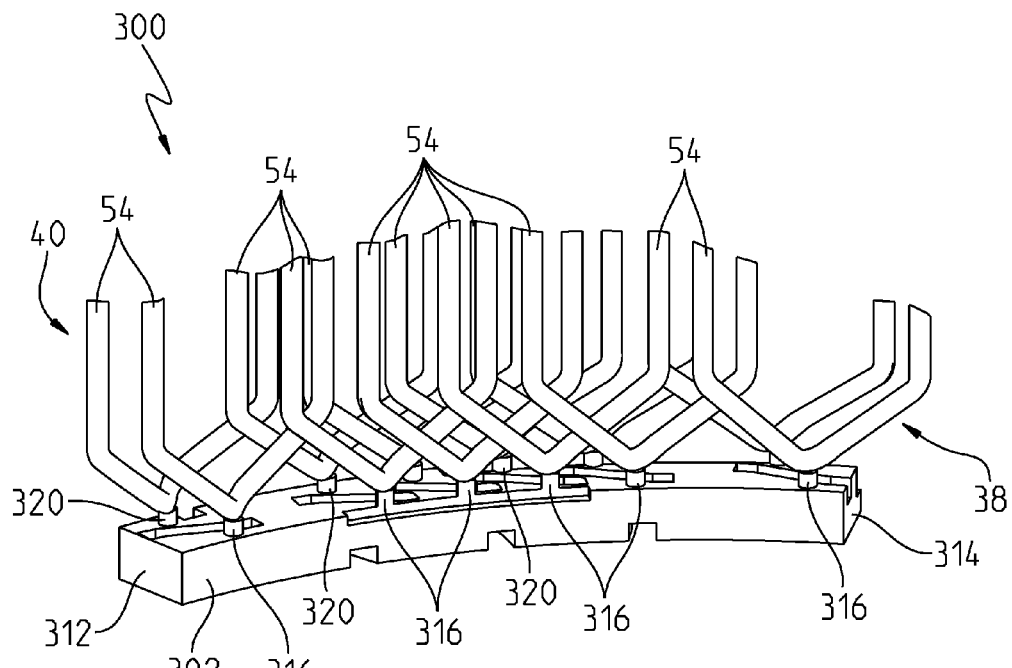
FIG. 25 is an inner perspective view showing short conductors cooperating with the spacer of FIG. 18.
Figure 26:
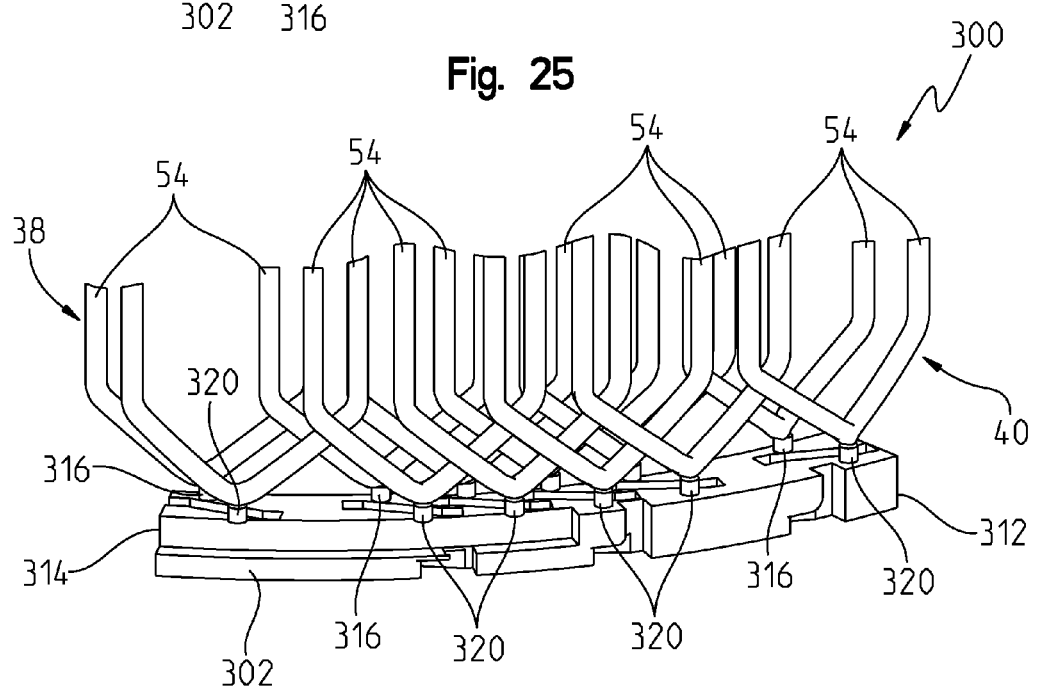
FIG. 26 is an outer perspective view similar to FIG. 25.

With reference to FIGS. 19, 25, and 26, the spacer 300 includes a positioning element defined by a first surface 315 supported by the insulating body 302 which faces axially inwardly for contacting selective short conductors 54 of the inner winding set 38. Illustratively, the first surface 315 is collectively defined by a plurality of circumferentially spaced first pegs or pads 316 extending axially inwardly from the inner surface 304 of the spacer 300. A second positioning element is defined by a second surface 318 supported by the insulating body 102. The second surface 318 is positioned radially inwardly from the first surface 314 and faces axially inwardly for contacting a plurality of short conductors 54 of the outer winding set 40. Again, the second surface 318 is collectively defined by a plurality of circumferentially spaced second pegs or pads 320 extending axially inwardly from the inner surface 304, the first pads 316 positioned radially inwardly from the second pads 320.

Figure 23:
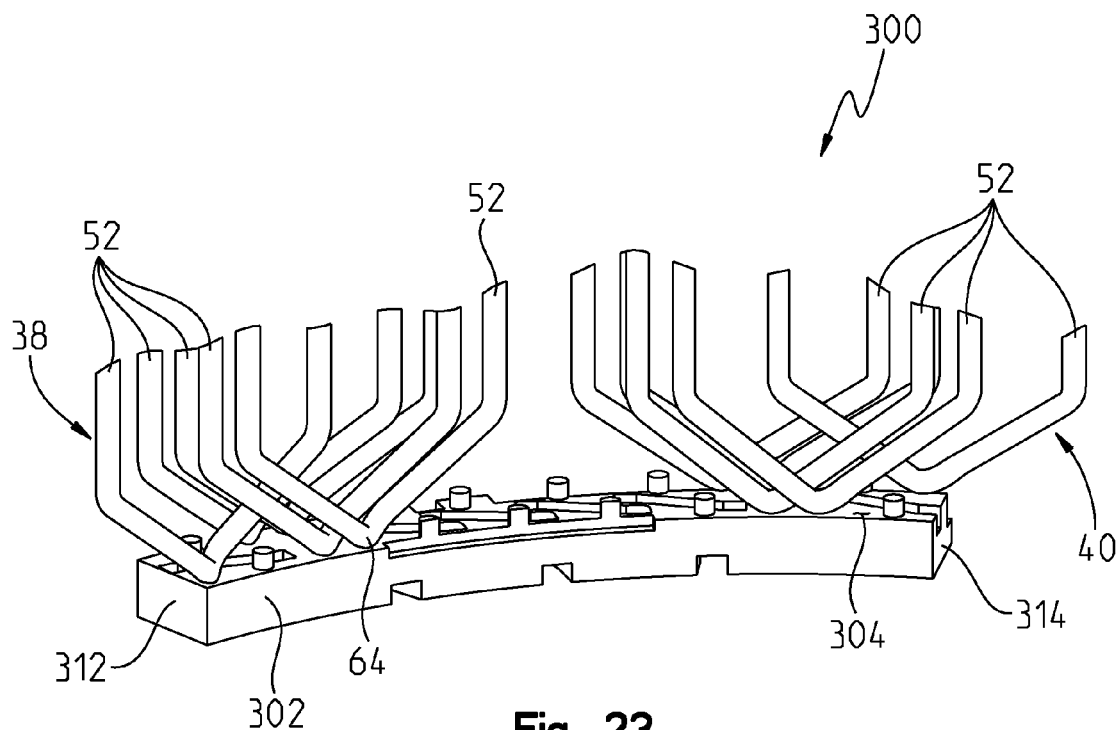
FIG. 23 is an inner perspective view showing common conductors cooperating with the spacer of FIG. 18.
Figure 24:
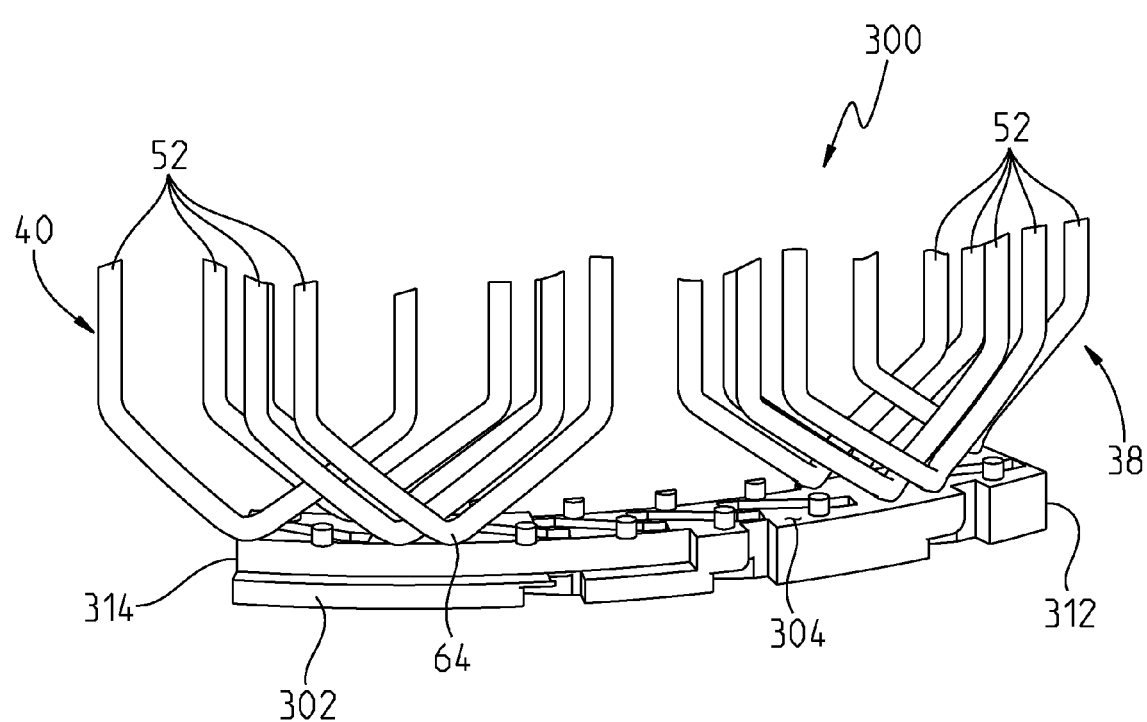
FIG. 24 is an outer perspective view similar to FIG. 23.

With reference to FIGS. 19, 23, and 24, the inner surface 304 defines a third positioning element of surface supported by the insulating body 302. The inner surface 304 faces axially inwardly for contacting a plurality of common conductors 52 within the specials region 61 of the outer winding set 38 and the inner winding set 40.

Figure 27:
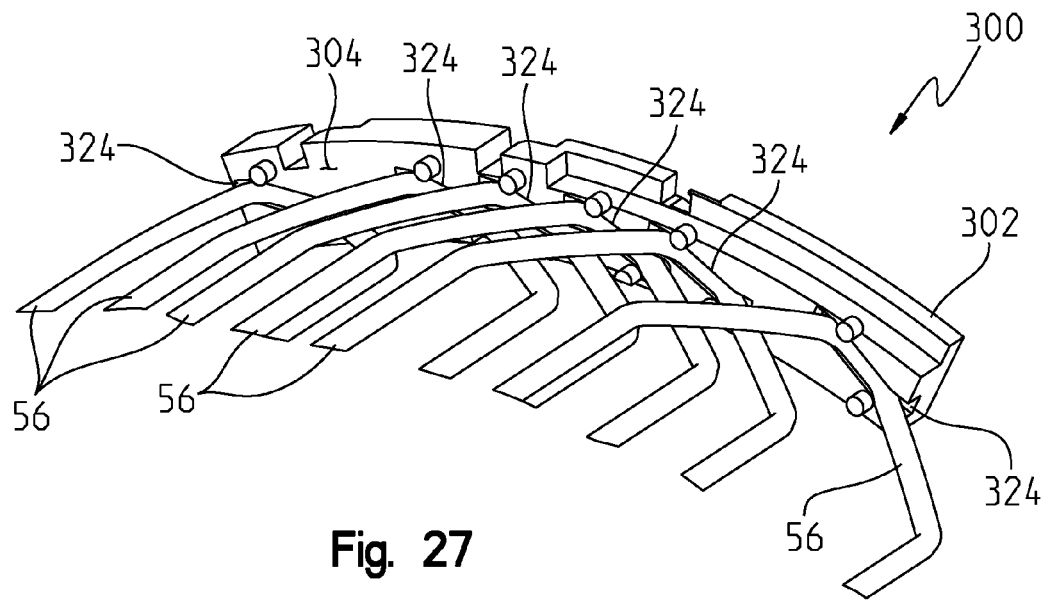
FIG. 27 is a perspective view of crossover conductors cooperating with the spacer of FIG. 18.

Referring to FIGS. 19 and 27, a fourth positioning element is defined by a plurality of crossover pockets 324 extending inwardly within the inner surface 304 of the spacer 300 and extending radially intermediate the first surface 316 and the second surface 320. The crossover pockets 324 face axially inwardly for receiving the crossover conductors 56. More particularly, the crossover pockets 324 extend circumferentially and radially intermediate opposing surfaces 308 and 310 for accommodating the turn portions 57 of the crossover conductors 56. The crossover pockets 324 are illustratively positioned radially intermediate the first and second pads 316 and 320.

With reference to FIGS. 19 and 28, a fifth positioning element of the spacer 300 is a neutral pocket 328 formed within the spacer 300 for receiving the neutral conductor 58. The neutral pocket 328 is formed within an axially inwardly facing, radially inner edge of the insulating body 302 defined by inner surface 304 and outer side 310.

Figure 18:
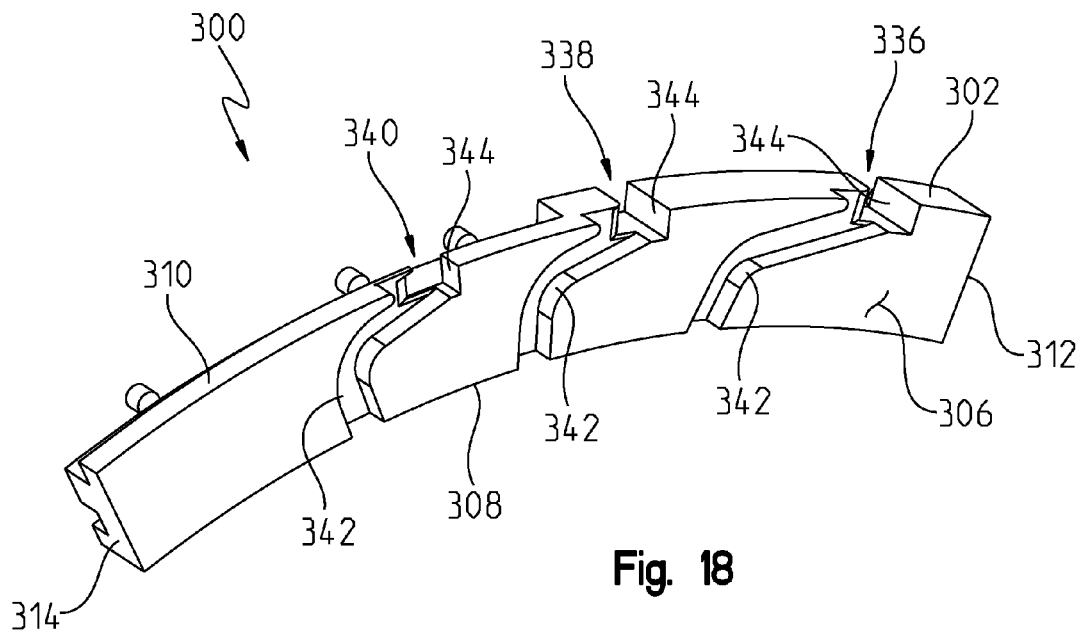
FIG. 18 is a outer perspective view of an illustrative spacer of the present disclosure.
Figure 29:
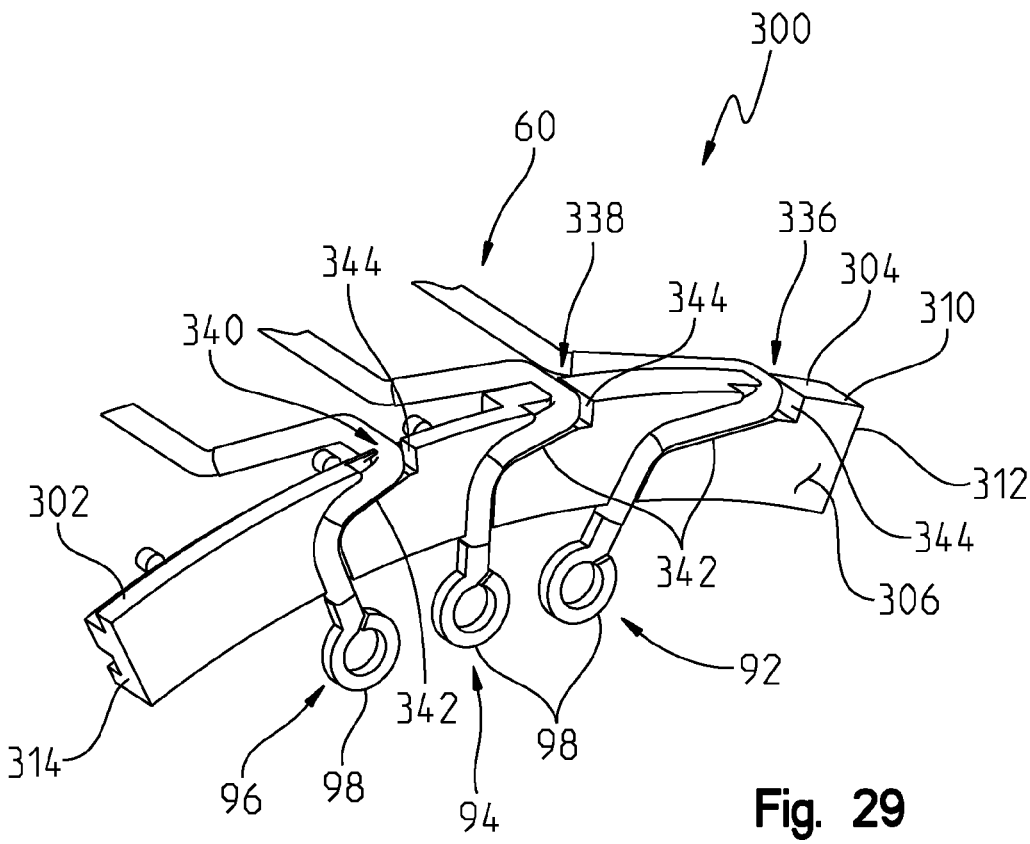
FIG. 29 is an outer perspective view showing terminal phase leads cooperating with the spacer of FIG. 18.
Figure 30:
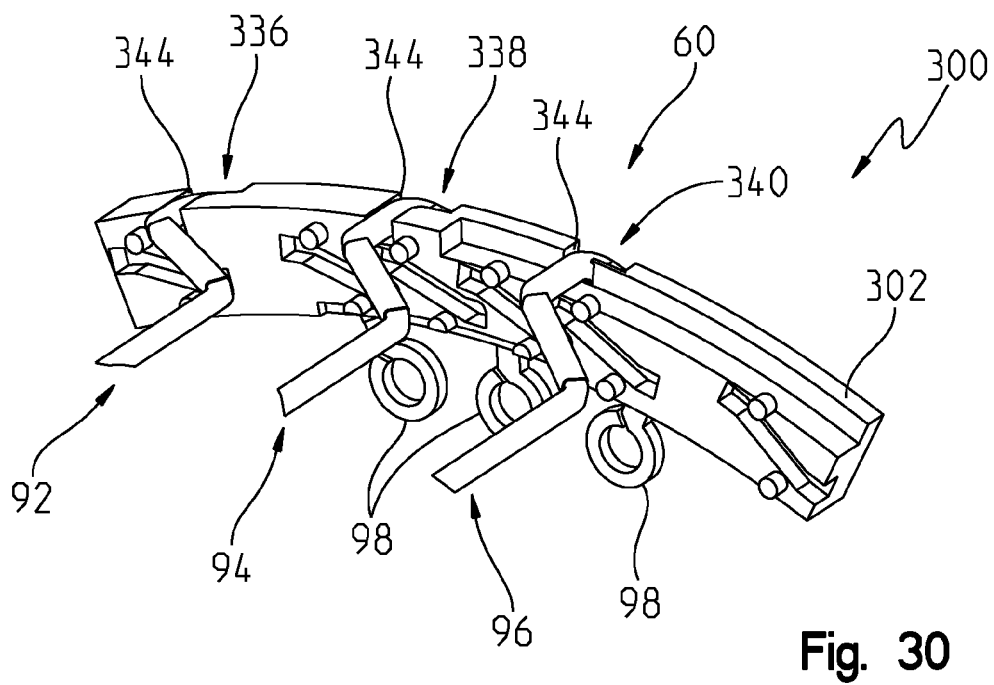
FIG. 30 is an inner perspective view similar to FIG. 29.

Referring to FIGS. 18 and 29-30, a sixth positioning element of the spacer 300 includes a plurality of phase lead pockets 336, 338, 340 supported by the insulating body 302. The phase lead pockets 336, 338, 340 each include a first portion 342, and a second portion 344. The first portion 342 is formed within the outside surface 306 of the body 302 and faces axially outwardly. The second portion 344 is an axially extending slot formed within outer side 310 and facing radially outwardly. The first portion 342 and the second portion 344 receive the legs 92, 94, 96 of the terminal phase lead conductors 60.

Referring to FIGS. 19 and 28, the jumper conductor 211 is received within a jumper pocket 350 formed within an axially inwardly facing, radially inner edge of the insulating body 302 defined by inner surface 304 and inner side 308. The jumper pocket 350 extends circumferentially and receives the turn portion 215 of the jumper conductor 211.

An illustrative method forming stator assembly 10 is detailed herein. Except as otherwise noted, the method of forming stator assembly 210 will be substantially the same. The illustrative method includes the steps of providing the stator core 20 and inserting a plurality of common conductors 52 and short conductors 54 within the core 20. More particularly, the common conductors 52 and the short conductors 54 are inserted into selective slots 36 through the insertion end 14 of the stator core 20. A plurality of crossover conductors 56 are also inserted within selective slots 36 at the insertion end 14 of the stator core 20. Neutral conductors 58 are also received within the insertion end 14 of selective slots 36 in the stator core 20. In the series stator assembly 210, jumper conductors 211 are inserted into the stator core 20 and replace one of the neutral conductors 58.

Next, the spacer 100 is positioned proximate the insertion end 14 of the stator core 20, wherein the first and second surfaces 115 and 118 of the spacer 100 are aligned with the short conductors 54, the crossover pockets 124 are aligned with the crossover conductors 56, and the inner surface 104 is aligned with the common conductors 52. Spacer 100 is then moved toward the insertion end 14 of the stator core 20 such that the short conductors 54 engage the first and second surfaces 115 and 118 and are pushed into the respective slots 36 in the stator core 20, and the crossover conductors 56 are received within the crossover pockets 124 of the spacer 100. In certain illustrative embodiments, the inner surface 104 of the spacer 100 may rest against the turn portions 64 of the common conductors 52. The neutral conductor 58 is also positioned within the neutral pocket 128 of the spacer 100. In the series stator assembly 210, a selective jump conductor 211 is positioned within the jump pocket 350 of the spacer 300. The terminal phase leads conductor 60 may be positioned within the phase lead pockets 136, 138, 140 of the spacer 100.

The spacers 100 and 300 detailed herein provide fixed spacing between various conductors 30 within the specials region 61 of the respective stator assembly 10 and 210. Spacer 100, 300 also assists with fixed positioning of phase lead eyelets 98 for proper alignment with a terminal block. Body 102, 302 of each spacer 100, 300 provides for electrical insulation between the respective conductors 30 within the specials region 61. Given the spatial orientation and electrical insulation functions of the spacer 100, 300, insulation material typically applied to individual conductors 30 may be eliminated in many instances. Additionally, the spacers 100 and 300 may be used as an assembly tool permitting simultaneous insertion of conductors 30 within the specials region 61 while maintaining relative spacing between the inserted conductors 30.

Although the invention has been described in detail with reference to certain preferred embodiments, variations and modifications exist within the spirit and scope of the invention as described and defined in the following claims.

The invention claimed is:

1. A spacer for supporting conductors in the stator assembly of an electric machine, the spacer comprising:
   an insulating body formed of an electrically non-conductive material;
   a first surface supported by the insulating body, the first surface facing axially inwardly for contacting a plurality of short electrical conductors of an inner winding set;
   a second surface supported by the insulating body, the second surface positioned radially inwardly from the first surface and facing axially inwardly for contacting a plurality of short electrical conductors of an outer winding set;

a crossover pocket supported by the insulating body, the crossover pocket extending radially intermediate the first surface and the second surface, and facing axially inwardly for receiving an electrical conductor defining a crossover conductor to electrically connect the inner winding set and the outer winding set; and a phase lead pocket supported by the insulating body, the phase lead pocket facing axially outwardly for receiving a terminal phase lead conductor.

2. The spacer of claim 1, further comprising a third surface supported by the insulating body, the third surface facing axially inwardly for contacting a plurality of common electrical conductors of the outer winding set and the inner winding set.

3. The spacer if claim 2, further comprising a neutral pocket supported by the insulating body, the neutral pocket facing axially outwardly for receiving an electrical conductor defining a neutral conductor providing a neutral connection between different winding phases of the outer winding set and the inner winding set.

4. The spacer of claim 3, wherein the neutral pocket is formed within an axially inwardly facing, radially inner edge of the insulating body.

5. The spacer of claim 4, further comprising an FEP heat shrink wrap over a Kevlar sleeve over at least a portion of the neutral connector.

6. The spacer of claim 2, wherein the first surface is defined by a plurality of circumferentially spaced first pads extending axially inwardly from the third surface, and the second surface is defined by a plurality of circumferentially spaced second pads extending axially inwardly from the third surface, the first pads positioned radially inwardly from the second pads.

7. The spacer of claim 6, wherein a plurality of the crossover pockets extend circumferentially and positioned radially intermediate the first and second pads.

8. The spacer of claim 1, wherein the a plurality of the phase lead pockets extend radially between an radially inner edge of the insulating body to a radially outer edge of the insulating body.

9. The spacer of claim 8, further comprising a connector eyelet position at the radially inner edge of the phase lead pockets.

10. The spacer of claim 1, wherein the insulating body is formed of a polymer.

11. The spacer of claim 10, wherein the insulating body is formed of polytetrafluoroethylene.

12. An electric machine comprising:
a stator core including a sidewall extending about a longitudinal axis;
an inner winding set supported by the stator core and including a plurality of common electrical conductors and a plurality of short electrical conductors, the first winding set being a multi-phase winding provided in a first conductor layer and a second conductor layer positioned radially outwardly from the first conductor layer;
an outer winding set supported by the stator core and positioned radially outwardly from the inner winding set and including a plurality of common electrical conductors and a plurality of short electrical conductors, the second winding set being a multi-phase winding provided in a third conductor layer and a fourth conductor layer positioned radially outwardly from the third conductor layer;
a plurality of crossover conductors supported by the stator core for electrically connecting the inner winding set and the outer winding set;
a plurality of terminal phase lead conductors supported by the stator core, each terminal phase lead conductor electrically coupled to one of the phases of the inner and outer winding sets; and
a spacer including an insulating body formed of a non-conductive material, the spacer positioned axially outwardly from the stator core and including a plurality of positioning elements cooperating short electrical conductors of the inner and outer winding sets, the common electrical conductors of the inner and outer winding sets, the plurality of crossover conductors, and the terminal phase lead conductors.

13. The electric machine of claim 12, wherein the positioning elements of the spacer include:
a first surface supported by the insulating body, the first surface facing axially inwardly for contacting a plurality of the short electrical conductors of the inner winding set; and
a second surface supported by the insulating body, the second surface positioned radially inwardly from the first surface and facing axially inwardly for contacting a plurality of the short electrical conductors of the outer winding set.

14. The electric machine of claim 13, wherein the positioning elements of the spacer include a third surface facing axially inwardly for contacting a plurality of the common electrical conductors of the outer winding set and the inner winding set.

15. The electric machine of claim 14, wherein the positioning elements of the spacer further include a plurality of crossover pockets supported by the insulating body, the crossover pocket extending radially intermediate the first surface and the second surface, and facing axially inwardly for receiving the crossover conductors.

16. The electric machine of claim 15, wherein the positioning elements of the spacer further include a plurality of phase lead pockets supported by the insulating body, the phase lead pockets facing axially outwardly for receiving a terminal phase lead conductors.

17. The electric machine of claim 16, further comprising:
a neutral conductor providing a neutral connection between different winding phases of the inner winding set and the outer winding set; and
wherein the positioning elements of the spacer further includes a neutral pocket for receiving the neutral conductor.

18. The electric machine of claim 17, wherein the neutral pocket is formed within an axially inwardly facing, radially inner edge of the insulating body.

19. The electric machine of claim 17, further comprising an FEP heat shrink wrap over a Kevlar sleeve over at least a portion of the neutral connector.

20. The electric machine of claim 13, wherein the first surface is defined by a plurality of circumferentially spaced first pads extending axially inwardly from the third surface, and the second surface is defined by a plurality of circumferentially spaced second pads extending axially inwardly from the third surface, the first pads positioned radially inwardly from the second pads.

21. The electric machine of claim 13, wherein the positioning elements of the spacer include a plurality of the crossover pockets extending radially intermediate the first surface and the second surface, and facing axially inwardly for receiving the crossover conductors.

22. The electric machine of claim 12, wherein the positioning elements of the spacer include a plurality of the phase lead pockets receiving the terminal phase lead conductors, the plurality of the phase lead pockets extend radially between an radially inner edge of the insulating body to a radially outer edge of the insulating body.

23. The electric machine of claim 22, further comprising a connector eyelet position at the radially inner edge of the phase lead pockets.

24. The electric machine of claim 12, wherein the insulating body is formed of a polymer.

25. The electric machine of claim 24, wherein the insulating body is formed of polytetrafluoroethylene.

26. The electric machine of claim 12, wherein the conductors comprise hairpin conductors include first and second legs and a u-turn portion connecting the first and second legs.

* * * * *